(12) United States Patent
Dorin et al.

(10) Patent No.: US 9,445,165 B2
(45) Date of Patent: Sep. 13, 2016

(54) SYSTEM AND METHOD FOR AN OPTICAL COUPLER

(71) Applicant: Futurewei Technologies, Inc., Plano, TX (US)

(72) Inventors: Bryce Dorin, Ottawa (CA); Winnie N. Ye, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 68 days.

(21) Appl. No.: 14/291,957

(22) Filed: May 30, 2014

(65) Prior Publication Data

US 2014/0355979 A1 Dec. 4, 2014

Related U.S. Application Data

(60) Provisional application No. 61/829,704, filed on May 31, 2013.

(51) Int. Cl.
*G02B 6/26* (2006.01)
*H04Q 11/00* (2006.01)
(Continued)

(52) U.S. Cl.
CPC ......... *H04Q 11/0005* (2013.01); *G02F 1/2257* (2013.01); *G02F 1/3136* (2013.01); *G02B 2006/12147* (2013.01); *G02B 2006/12159* (2013.01); *G02F 2202/105* (2013.01); *G02F 2203/07* (2013.01); *H04Q 2011/0035* (2013.01)

(58) Field of Classification Search
USPC .......................................................... 385/48
See application file for complete search history.

(56) References Cited

U.S. PATENT DOCUMENTS

2002/0025103 A1\* 2/2002 Thaniyavarn ......... G02F 1/3136
  385/15
2002/0159684 A1 10/2002 Sun et al.
(Continued)

OTHER PUBLICATIONS

Chen, L. et al., "Photonic Switching for Data Center Application," IEEE Photonics Society, vol. 3, No. 5, Oct. 2011, 12 pgs.
(Continued)

*Primary Examiner* — Eric Wong
(74) *Attorney, Agent, or Firm* — Slater Matsil, LLP

(57) ABSTRACT

In one embodiment, an optical directional coupler includes an input terminal configured to receive an input optical signal and a first coupler optically coupled to the input terminal, where the first coupler has a first coupling length, and where the first coupler is configured to couple a first portion of the input optical signal to a first optical leg and a second optical portion of the input optical signal to a second optical leg. The optical directional coupler also includes the first optical leg, where the first optical leg is configured to phase shift the first portion of the optical signal to produce a first phase shift signal and the second optical leg, where the second optical leg is configured to phase shift the second portion of the optical signal to produce a second phase shift signal, and where the first phase shift signal has a phase difference relative to the second phase shift signal. Additionally, the optical directional coupler includes a second coupler configured to receive the first phase shift signal and the second phase shift signal and to output a first output optical signal to a first output, where the second coupler has a second coupling length, where a crosstalk of the input optical signal to a second output is below −15 dB for both transverse electrical (TE) polarized light and transverse magnetic (TM) polarized over a wavelength range spanning 40 nm.

20 Claims, 28 Drawing Sheets

(51) Int. Cl.
  *G02F 1/225* (2006.01)
  *G02F 1/313* (2006.01)
  *G02B 6/12* (2006.01)

(56) References Cited

U.S. PATENT DOCUMENTS

| 2004/0008965 | A1 | 1/2004 | Betty | |
|---|---|---|---|---|
| 2006/0198572 | A1* | 9/2006 | Yegnanarayanan | G02F 1/025 385/14 |
| 2010/0111470 | A1* | 5/2010 | Assefa | G02F 1/2257 385/16 |
| 2010/0303476 | A1* | 12/2010 | Barton | H04B 10/505 398/212 |
| 2011/0013195 | A1* | 1/2011 | Okayama | G02B 6/105 356/477 |

OTHER PUBLICATIONS

Dai, D. et al., "Design of a polarization-insensitive arrayed waveguide grating demultiplexer based on silicon photonic wires," Optics Letters, vol. 31, No. 13, Jul. 1, 2006, 3 pgs.

Dai, D. et al., "Polarization management for silicon photonic integrated circuits," Wiley Online Library, Laser Photonics Rev., 1-26 (Oct. 1, 2012), www.lpr-journal.org, 26 pgs.

Deng, H. et al., "Fabrication tolerance of asymmetric silicon-on-insulator polarization rotators," Optical Society of America, vol. 23, No. 7, Jul. 2006, 5 pgs.

Dong, P., et al., "Submilliwatt, ultrafast and broadband electro-optic silicon switches," Optics Express, vol. 18, No. 24, Nov. 22, 2010, 7 pages.

Fukuda, H. et al., "Polarization rotator based on silicon wire waveguides," Optics Express, vol. 16, No. 4, Feb. 18, 2008, 8 pages.

Goh, T. et al., "Low Loss and High Extinction Ratio Strictly Nonblocking 16×16 Thermooptic Matrix Switch on 6-in Wafer Using Silica-Based Planar Lightwave Circuit Technology," Journal of Lightwave Technology, vol. 19, No. 3, Mar. 2001, 9 pgs.

Headley, W. et al., "Polarization-independent optical racetrack resonators using rib waveguides on silicon-on-insulator," Applied Physics Letters, vol. 85, No. 23, Dec. 6, 2004, 4 pages.

Hewitt, P.D. et al., "Improving the Response of Optical Phase Modulators in SOI by Computer Simulation," Journal of Lightwave Technology, vol. 18, No. 3, Mar. 2000, 8 pgs.

Himeno, A. et al., "Silica-based low loss and high extinction ratio 8×8 thermo-optic matrix switch with path-independent loss arrangement using double Mach-Zehnder interferometer switching units," ECOC '96. 22nd European Conference on Optical Communication, vol. 4, Sep. 19, 1996, 4 pgs.

Inoue, Y. et al., "Elimination of Polarization Sensitivity in Silica-Based Wavelength Division Multiplexer Using a Polyimide Half Waveplate," Journal of Lightwave Technology, vol. 15, No. 10, Oct. 1997, 11 pgs.

Inoue, Y. et al., "Polarization Mode Converter With Polyimide Half Waveplate in Silica-Based Planar Lightwave Circuits" IEEE Photonics Technolgoy Letters, vol. 6, No. 5, May 1994, 3 pgs.

Jinguji, K. et al., "Mach-Zehnder interferometer type optical waveguide coupler with wavelength-flattened coupling ratio," Electronics Letters, vol. 26, No. 17, Aug. 16, 1990, 2 pgs.

Jinguji, K. et al., "Two-Port Optical Wavelength Circuits Composed of Cascaded Mach-Zehnder Interferometers with Point-Symmetrical Configurations," Journal of Lightwave Technology, vol. 14, No. 10, Oct. 1996, pp. 2301-2310.

Kitoh, T., et al., "Novel Broad-Band Optical Switch Using Silica-Based Planar Lightwave Circuit," IEEE Photonics Technology Letters, vol. 4, No. 7, Jul. 1992, 3 pages.

Nedeljkovic, M. et al., "Free-Carrier Electrorefraction and Electroabsorption Modulation Predictions for Silicon Over the 1-14-um Infrared Wavelength Range," IEEE Photonics Journal, vol. 3, No. 6, Dec. 2011, 11 pgs.

Okuno, M. et al., "Silica-based 8×8 optical matrix switch integrating new switching units with large fabrication tolerance," Journal of Lightwave Technology, vol. 17, No. 5, May 1999, pp. 771-781.

Soref, R. et al., "Electrooptical Effects in Silicon," IEEE Journal of Quantum Electronics, vol. QE-23, No. 1, Jan. 1987, pp. 123-129.

Ushio, T. et al., "H-2, Proposal of Polarization—Independent Silicon Wire-Waveguide Directional Coupler Optical Switch," 17th Microoptics Conference (MOC'11) Sedai, Japan, Oct. 30-Nov. 2, 2011, 2 pages.

Van Campenhout, J. et al., "Design of a digital, ultra-broadband electro-optics switch for reconfigurable optical networks-on-chip," Optics Express, vol. 17, No. 26, Dec. 21, 2009, 16 pgs.

Van Campenhout, J. et al., "Drive-noise-tolerant broadband silicon electro-optic switch," Optics Express, vol. 19, No. 12, Jun. 6, 2011, 10 pgs.

Van Campenhout, J. et al., "Low-power, 2×2 silicon electro-optic switch with 110-nm bandwidth for broadband reconfigurable optical networks," Optics Express, vol. 17, No. 26, Dec. 21, 2009, 10 pgs.

Watts, M.R. et al., "Integrated mode-evolution-based polarization rotators," Optics Letters, vol. 30, No. 2, Jan. 15, 2005, 3 pgs.

International Search Report and Written Opinion of Patent Cooperation Treaty (PCT), International Application No. PCT/US2014/040354, Applicant: Huawei Technologies Co., Ltd., date of mailing Jan. 29, 2015, 12 pages.

* cited by examiner

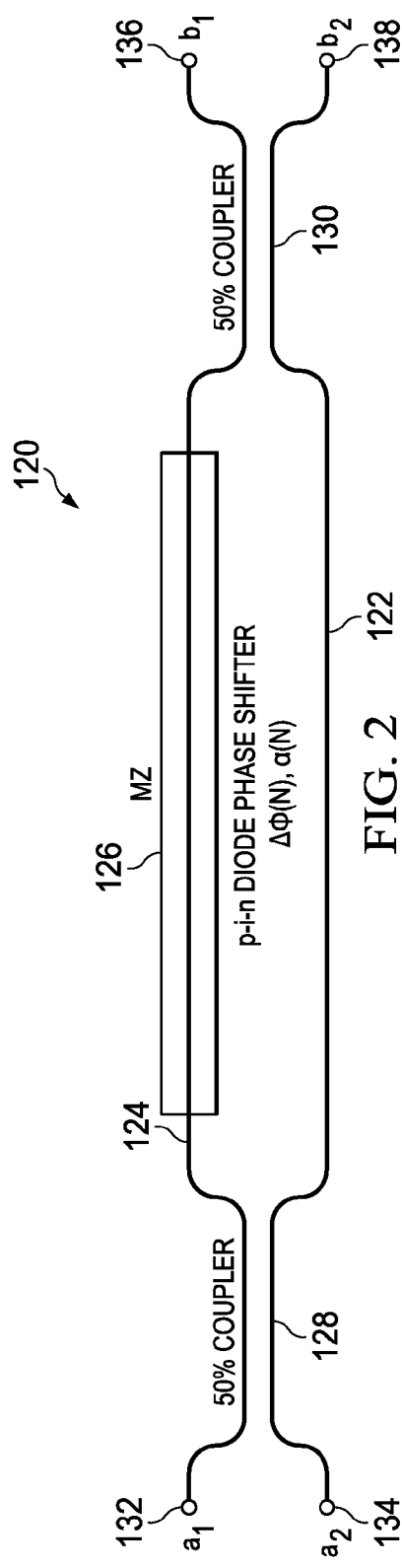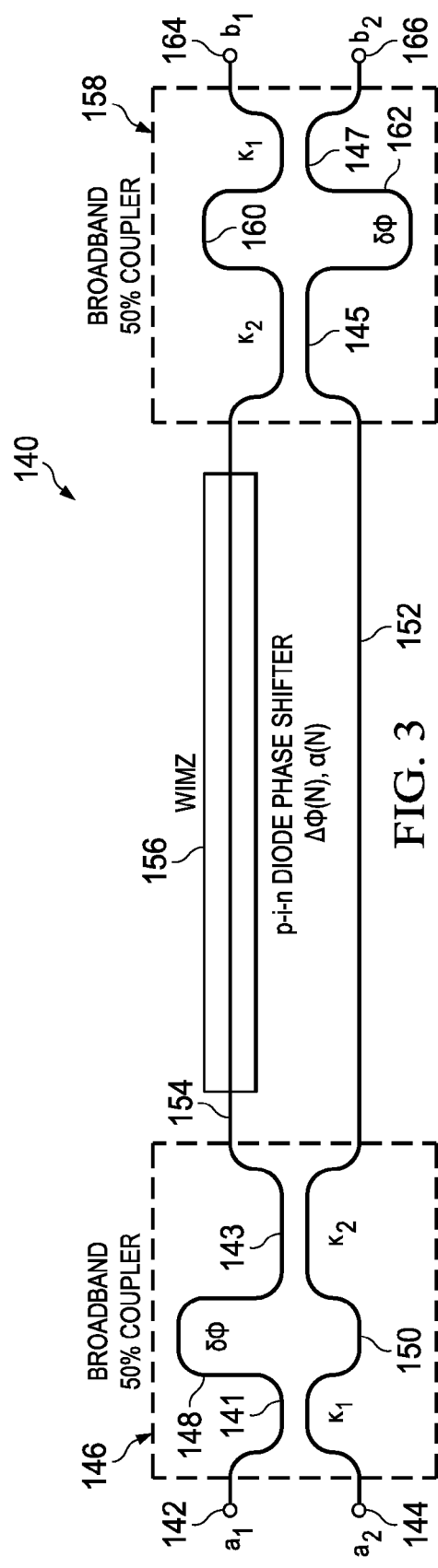

SYSTEM AND METHOD FOR AN OPTICAL COUPLER

This application claims the benefit of U.S. Provisional Application Ser. No. 61/829,704 filed on May 31, 2013, and entitled "Device and Method for a Polarization and Wavelength Insensitive Directional Coupler," which application is hereby incorporated herein by reference.

TECHNICAL FIELD

The present invention relates to a system and method for photonics, and, in particular, to a system and method for an optical coupler.

BACKGROUND

Optical packet switching (OPS) is a promising technology to handle the exponential growth of the internet. It is desirable for photonic elements to operate over large wavelength ranges with low polarization crosstalk. Elements such as directional couplers may be used in a photonic switching fabric in OPS.

Optical devices may be integrated in a photonic integrated circuit (PIC) containing optical waveguides. Optical waveguides are light conduits that contain a slab, strip, or cylinder of a dielectric material surrounded by another dielectric material having a lower refractive index. The light propagates along, and is confined to, the higher refractive index material through total internal reflection. In a PIC, the core may be silicon, surrounded by a lower refractive index material, such as silicon dioxide, silicon nitride, silicon oxynitride, and/or air. The waveguides may be a single mode or multi-mode waveguide. In an example, a PIC operates at a telecommunications waveband, such as 1550 nm or 1310 nm. The light may be coupled into, out of, or between optical waveguides. In a PIC, multiple photonic functions are integrated on a substrate, such as silicon-on-insulator (SOI). PICs are used for optical communications, and for other applications, such as biomedical applications and photonic computing. PICs may provide increased functionality, while being compact, and enabling higher performance than discrete optical devices.

SUMMARY

An embodiment optical directional coupler includes an input terminal configured to receive an input optical signal and a first coupler optically coupled to the input terminal, where the first coupler has a first coupling length, and where the first coupler is configured to couple a first portion of the input optical signal to a first optical leg and a second optical portion of the input optical signal to a second optical leg. The optical directional coupler also includes the first optical leg, where the first optical leg is configured to phase shift the first portion of the optical signal to produce a first phase shift signal and the second optical leg, where the second optical leg is configured to phase shift the second portion of the optical signal to produce a second phase shift signal, and where the first phase shift signal has a phase difference relative to the second phase shift signal. Additionally, the optical directional coupler includes a second coupler configured to receive the first phase shift signal and the second phase shift signal and to output a first output optical signal to a first output, where the second coupler has a second coupling length, where a crosstalk of the input optical signal to a second output is below −15 dB for both transverse electrical (TE) polarized light and transverse magnetic (TM) polarized over a wavelength range spanning 40 nm.

An embodiment optical switch includes a first directional coupler configured to receive an input optical signal and produce a first portion of the input optical signal and a second portion of the input optical signal, where a transmittance of the first directional coupler of the input optical signal to the second portion of the optical signal is below −15 dB for both transverse electrical (TE) mode and transverse magnetic (TM) mode over a wavelength range spanning 40 nm and a first leg configured to receive the first portion of the input optical signal and produce a first phase shifted optical signal. The optical switch also includes a second leg configured to receive the second portion of the input optical signal and produce a second phase shifted optical signal and a second directional coupler configured to receive the first phase shifted optical signal and the second phase shifted optical signal.

An embodiment method of designing a directional coupler includes calculating a transverse electrical (TE) coupling ratio error function of the directional coupler as a first function of a first coupling length, a second coupling length, and a phase shift and calculating a transverse magnetic (TM) coupling ratio error function of the directional coupler as a second function of the first coupling length, the second coupling length, and the phase shift. The method also includes minimizing the TE coupling ratio error function and the TM coupling ratio error function over a wavelength range to produce a selected first coupling length, a selected second coupling length, and a selected phase shift and fabricating the directional coupler having the selected first coupling length, the selected second coupling length, and the selected phase shift.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 2 illustrates a Mach-Zehnder interferometer;

FIG. 3 illustrates a wavelength insensitive Mach-Zehnder interferometer for transverse electric (TE) polarized light;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
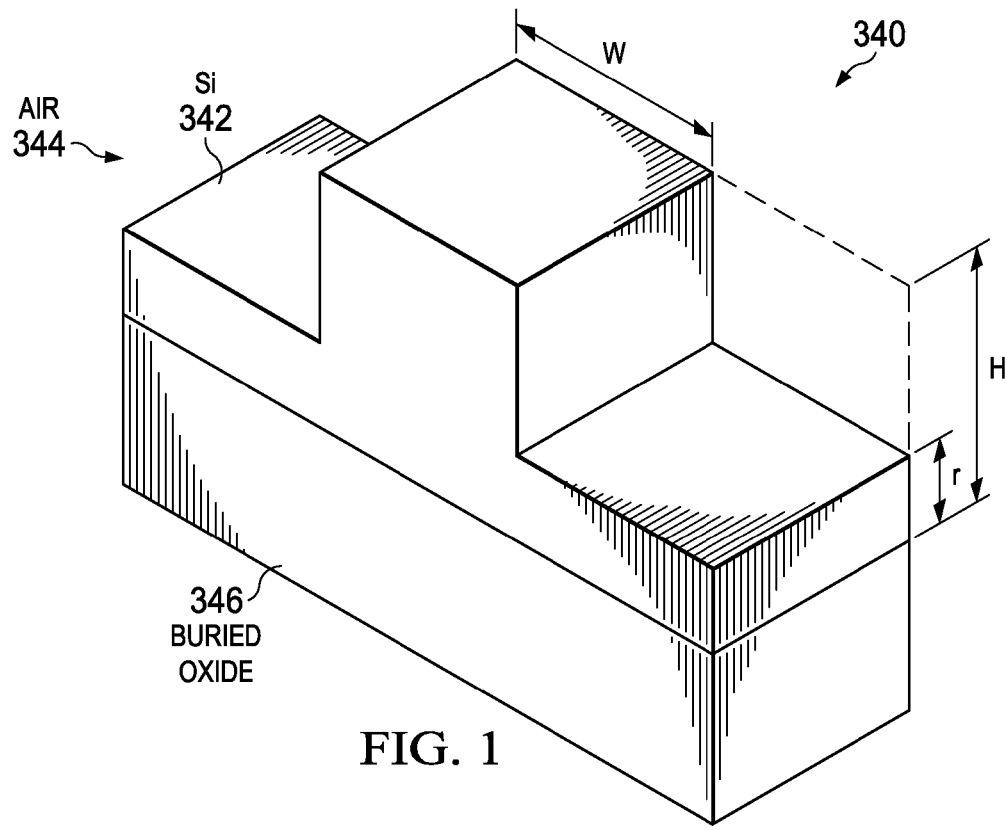
FIG. 1 illustrates an embodiment optical waveguide.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

An embodiment provides a wavelength and polarization insensitive directional coupler (WPIDC) which is optimized to reduce sensitivity to polarization over a wavelength range. The WPIDC includes a first directional coupler with a coupling length of $k_1$ and a second directional coupler with a coupling length $k_2$. The directionally couplers are optically connected by two waveguide arms with different optical path lengths, which have a phase shift of $\phi$. The independent variables $k_1$, $k_2$, and $\phi$ may be selected so the splitting ratio is similar for both transverse electric (TE) and transverse magnetic (TM) polarizations.

In optimizing the performance of a WPIDC, the independent variables are defined as the phase shift $\phi$ between the two arms, the coupling length $k_1$ of the first directional coupler, and the coupling length $k_2$ of the second directional coupler. The coupling ratio error function for the WPIDC is calculated over a wavelength range of interest for both TE and TM polarizations to obtain an array of error values. An embodiment also includes selecting a set of independent variables corresponding to a minimum value for the error values for both polarizations. These values are used to design a WPIDC.

Another embodiment provides a method for simultaneously optimizing both wavelength and polarization sensitivity of a Mach-Zehnder optical switch. The Mach-Zehnder optical switch contains two WPIDCs, one on either side of the Mach-Zehnder switch. One arm is active and the other arm is passive. Both arms contain two polarization rotators and two propagation regions. One of the polarization rotators rotates the polarization of the light, and the other reverses the polarization rotation.

Silicon waveguides are well suited for PICs because small device dimensions may be readily achieved. Because of the strong confinement factor of SOI waveguides, surface roughness dominates the optical losses, so the material loss is negligible. The strong confinement facilitates sharp waveguide bends, reducing device footprint. However, silicon waveguides possess a high structural birefringence. For example, traverse electrical (TE) and traverse magnetic (TM) polarized optical signals propagate at different phase velocities. $SiO_2$ and $SiON_x$ waveguides have low birefringence, but such waveguides have larger dimensions. In an example silicon waveguide, a silicon core with a high refractive index is surrounded by a low refractive index material, such as silicon dioxide, silicon nitride, silicon oxynitride, and/or air. A silicon waveguide may operate in the 1310 nm or 1550 nm optical communications waveband.

Silicon PIC chips may use a lithographically defined layout of single mode and multimode waveguide elements forming a photonic circuit.

An optical signal may be viewed as a propagating oscillating electric field orthogonal to an oscillating magnetic field at an optical frequency. The polarization of the optical field is indicated by the direction of the electric field vector. Propagating light may be decomposed into TE polarization and TM polarization. For TE polarized light, the electrical fields are orthogonal to the plane of propagation. For TM polarized light, the magnetic field is orthogonal to the direction of propagation.

It is desirable for a photonic element to perform similarly regardless of polarization state. Some optical components are optimized for a particular polarization, for example for TE polarization or TM polarization. Many optical components are affected by the polarization of the optical signal. For example, polarization mode dispersion (PMD), polarization dependent loss (PDL), and polarization dependent wavelength characteristics (PDlambda) may occur, especially when a highly birefringent material is used. Silicon waveguides may have a high geometrical birefringence. Silicon is useful for PICs because of its high index of refraction and its compatibility with electronic integrated circuit fabrication methods. In a birefringent material, the refractive index depends on the polarization of an optical signal. The magnitude of a phase shift depends on the confinement factor and effective index, which differs for TE and TM modes in a waveguide. The phase shift is given by:

$$\theta = \frac{2\pi}{\lambda}\Gamma\Delta nL_p, \text{ or}$$

$$\theta = \frac{2\pi}{\lambda}n_{\it eff}\Delta L_p$$

where $\lambda$ is the wavelength, $\Gamma$ is the confinement factor, $n_{\it eff}$ is the effective refractive index for the polarization, $\Delta n$ is the refractive index change induced into the waveguide, $L_p$ is the length of the device, and $\Delta L_p$ is the change in length of the device.

Large silicon waveguides may be polarization agnostic. However, such large waveguides have a large bend radius, leading to a low density of components. Also, such specially designed waveguides may be extremely sensitive to wavelength, dimensional parameter variations, and material parameter variations, so production may be problematic. It is desirable to use very fine waveguides for a high density PIC with a large refractive index contrast between the core and the cladding. This facilitates very small device sizes, but has a high birefringence.

When both TE and TM polarizations normally exist in an optical waveguide, a polarization diversity approach may be used. Polarization splitters split the optical signal to two separate paths based on polarization, with TE polarized light propagating along one path and TM polarized light propagating along the other path. Processing is applied to both paths in separate circuits to obtain similar effects. The outputs of the separate circuits are then combined. However, this approach leads to the device size more than doubling. Also, such networks may be susceptible to temperature gradients between the separate circuits.

In another example, the orientation of the TE and TM polarizations is exchanged at the midpoint of a semiconductor waveguide section. A gap is introduced into the waveguide at the midpoint, which leads to additional insertion losses. A discrete polarization rotating component is inserted into the gap for rotating both polarization orientations by ninety degrees. For example, a thin polyimide half waveplate may be inserted into the gap. Alternatively, a polarization splitting grating coupler is inserted into the gap. The assembly, with a micron tolerance, is costly.

An embodiment SOI rib waveguide structure 340 is illustrated in FIG. 1. Silicon rib 340 has a height H and a width W, which may be varied to achieve particular waveguide properties. Air 344 is over the waveguide, while buried oxide 342, for example silicon dioxide, is below the waveguide. The rib height r may be sufficiently thick to support carrier injection. Carrier injection is executed from strongly doped regions extending the full thickness of the rib to either side of the waveguide. When a voltage is applied across the doped regions, electrons and holes are injected into the waveguide core, resulting in a refractive index change $\Delta n$ and an absorption change $\Delta\alpha$ in the region. These values are calculated based on the electron density, $N_e$, and the hole density, $N_h$, in cubic centimeters, where:

$$\Delta n = -2.98 \times 10^{-22} N_e^{1.016} - 1.25 \times 10^{-18} N^{0.835},$$

and $$\Delta\alpha = 3.48 \times 10^{-22} N_e^{1.229} + 1.02 \times 10^{-19} N^{1.089}.$$

FIG. 2 illustrates Mach-Zehnder interferometer 120. A Mach-Zehnder interferometer may be used for switching in telecommunications, for example in high speed dense wavelength division multiplexing (DWDM). Incoming light enters input 132 or input 134, and proceeds to coupler 128, a 50:50 coupler, where it is split. Half of the optical signal is coupled to leg 124 and half of the optical signal is coupled to leg 122. The optical signals from legs 124 and 122 are combined by coupler 130, where it is output in output 136 or output 138. The output depends on the relative optical path lengths of leg 124 and leg 122. When the optical path lengths are the same, or have a difference in phase shift of a multiple of $2\pi$, between leg 124 and leg 122, there is complete constructive interference. However, if the path lengths have a relative phase shift of $-\pi$, $\pi$, $3\pi$, etc., there is complete destructive interference. For intermediate relative phase shifts, there is an intermediate interference. If the optical path lengths are varied, for example by variable phase shifter into one or both legs, Mach-Zehnder interferometer 120 may be used as an optical switch. As illustrated, phase shifter 126 is in leg 124. Phase shifter 126 may be a p-type intrinsic n-type (pin) diode phase shifter. A voltage may be applied to phase shifter 126 to adjust its optical path length. Mach-Zehnder interferometer 120 is integrated on a single substrate, for example on a PIC.

FIG. 3 illustrates wavelength insensitive Mach-Zehnder interferometer (WIMZI) 140. WIMZI 140 contains directional coupler 146 and directional coupler 158, with legs 152 and 154 in between. Leg 154 contains phase shifter 156. Directional coupler 146 has inputs 142 and 144, directional coupler 141 with coupling length $k_1$, legs 148 and 150 with a phase shift of $\Delta\phi$, and directional coupler 143 having a coupling length of $k_2$. On the other side of legs 152 and 154, directional coupler 158 has outputs 164 and 166, directional coupler 145 with a coupling length of $k_2$, legs 160 and 162 with a phase difference $\Delta\phi$, and directional coupler 147 with a coupling length of $k_1$.

Figure 4:
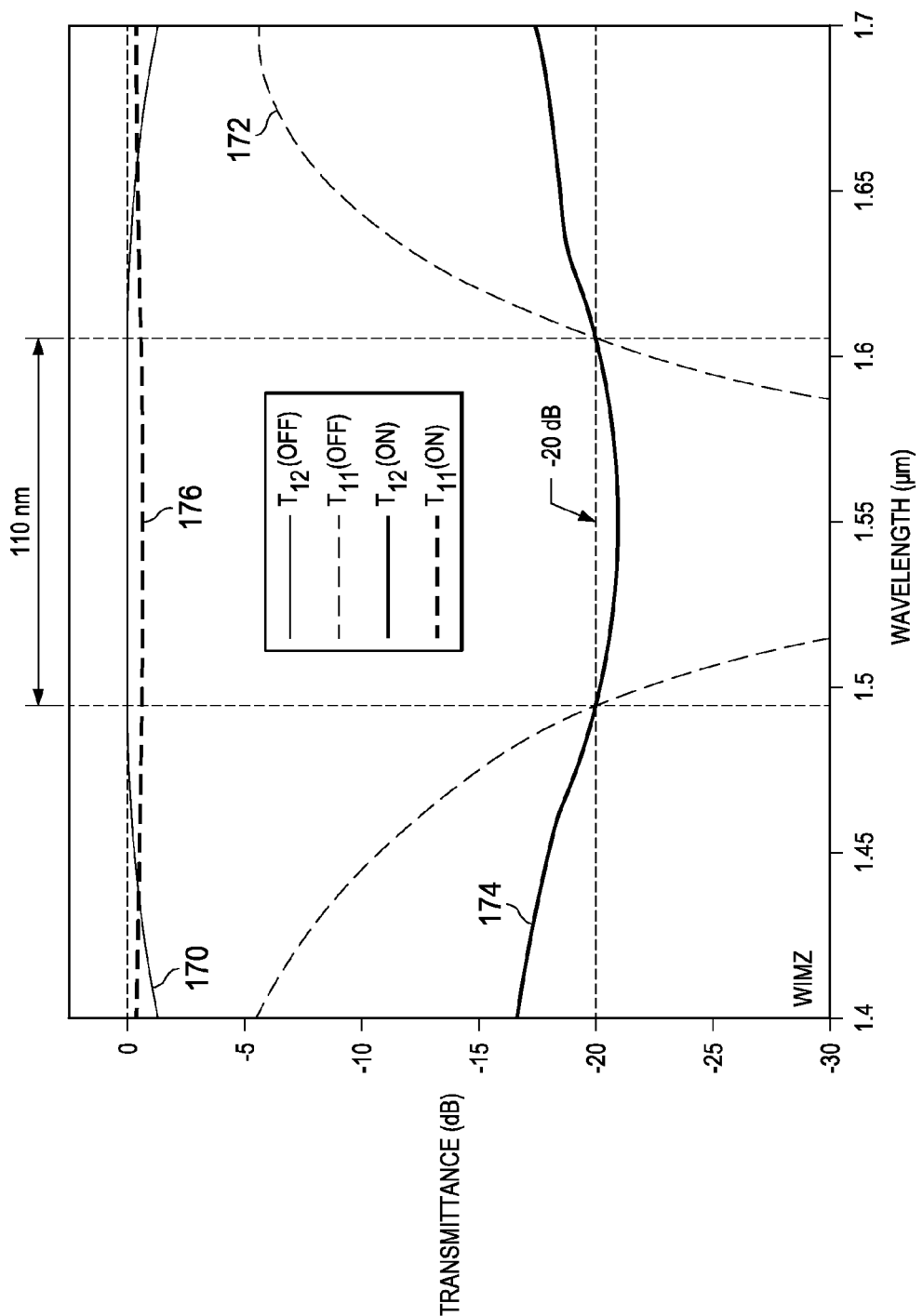
FIG. 4 illustrates a graph of transmittance versus wavelength for TE polarized light and transverse magnetic (TM) polarized light for a wavelength insensitive Mach-Zehnder interferometer optimized for TE polarized light.

FIG. 4 illustrates a graph of crosstalk for TE polarization for a WIMZE optimized for TE mode only. Curve 170 is for $T_{12}$ off, curve 172 is for $T_{11}$ off, curve 174 is for $T_{12}$ on, and curve 176 is for $T_{11}$ on.

Figure 5:
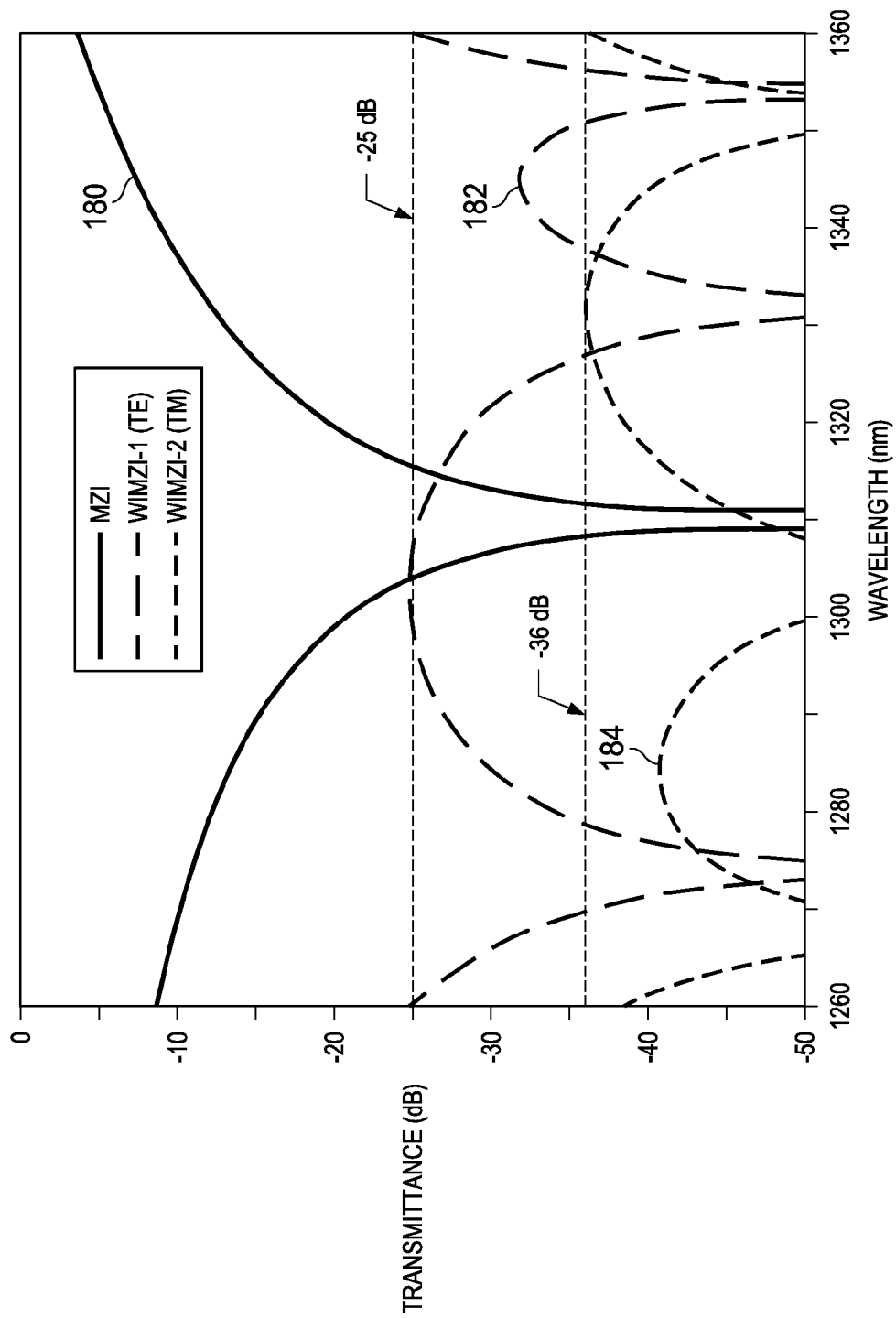
FIG. 5 illustrates a graph of transmittance versus wavelength for TE polarized light in a wavelength insensitive Mach-Zehnder interferometer optimized for TE polarized light and TM polarized light in a wavelength insensitive Mach-Zehnder interferometer optimized for TM polarized light.

FIG. 5 illustrates a graph of transmittance for a Mach-Zehnder interferometer and for WIMZIs optimized for a single polarization. Curve 180 shows the transmittance for a Mach-Zehnder interferometer, curve 182 shows the transmittance for a WIMZI optimized for TE polarization only, and curve 184 shows the transmittance for a WIMZI optimized for TM polarization.

Figure 6:
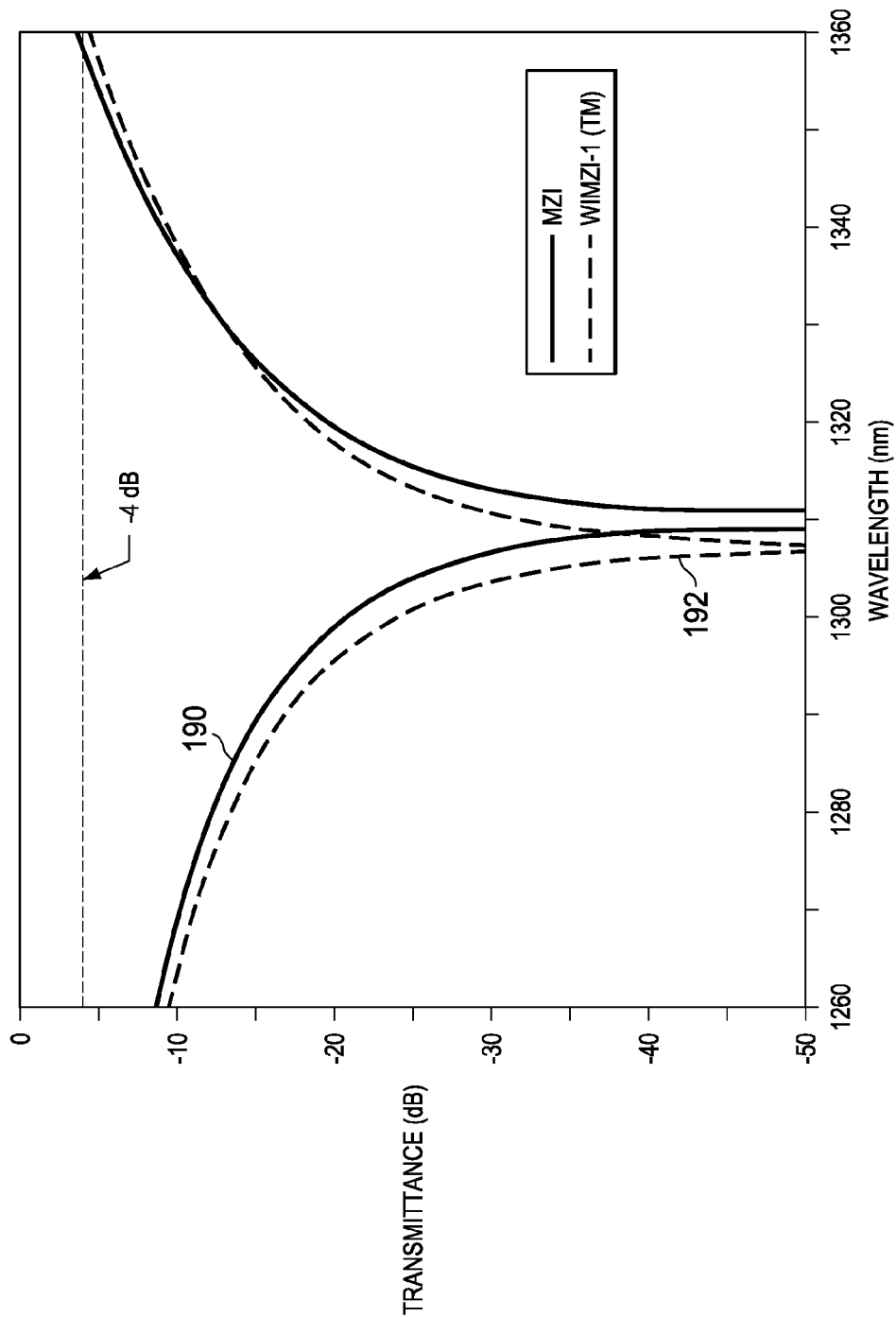
FIG. 6 illustrates a graph of transmittance versus wavelength for TM polarized light for a wavelength insensitive Mach-Zehnder interferometer optimized for TE polarized light.

FIG. 6 illustrates a graph of performance for TM polarized light in a wavelength-insensitive directional coupler (WIDC) optimized for TE performance. Curve 190 shows the performance of a Mach-Zehnder interferometer and curve 192 shows the performance for a WIMZI optimized for TE polarization for TM polarized light. The performance for TM polarization is poor.

Figure 7:
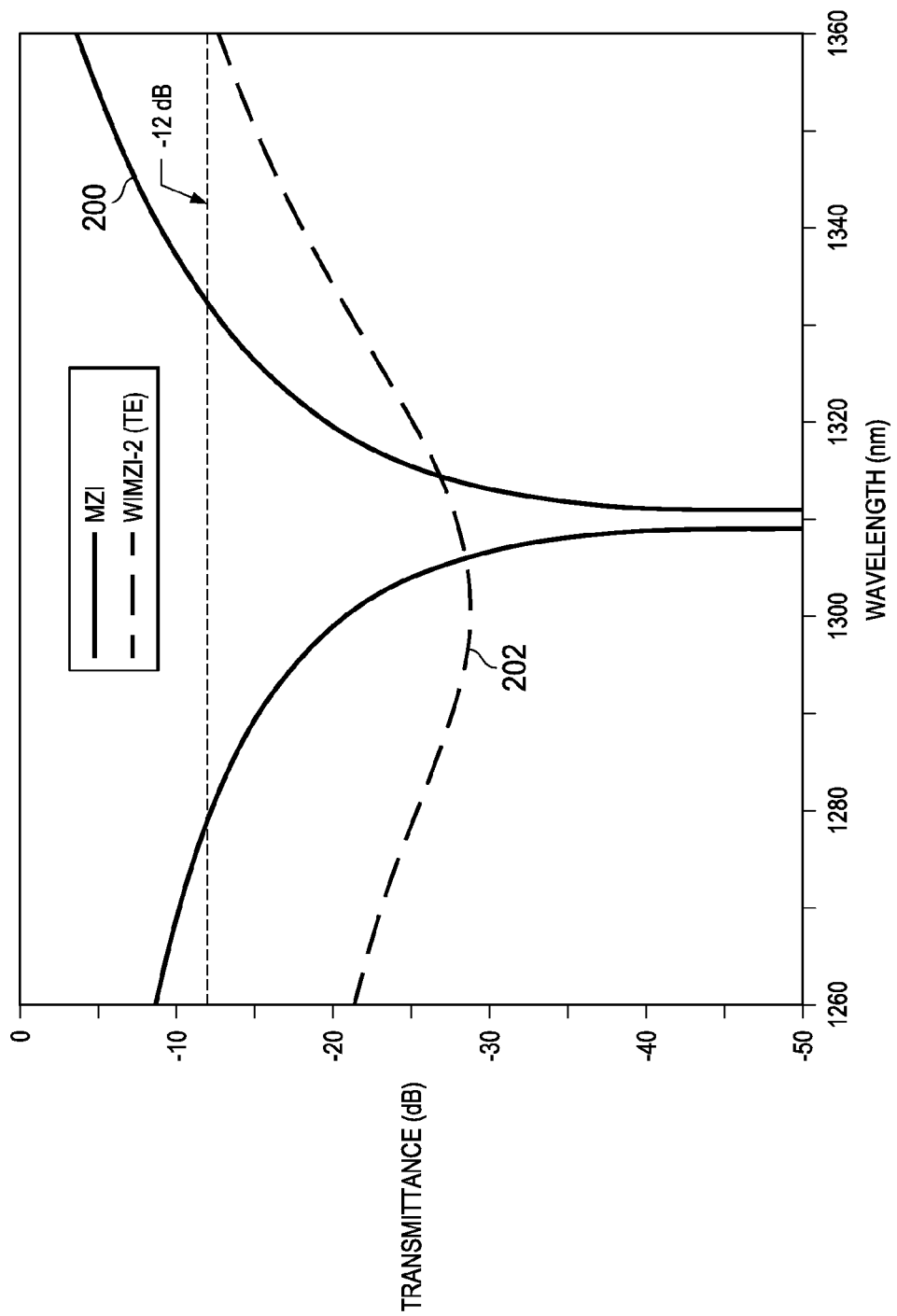
FIG. 7 illustrates a graph of transmittance versus wavelength for TE polarized light for a wavelength insensitive Mach-Zehnder interferometer optimized for TM polarized light.

Similarly, FIG. 7 shows a graph for TE polarized light in a WIDC optimized for TM polarized light. Curve 200 shows the transmittance of a Mach-Zehnder interferometer and curve 202 shows the performance for TE polarized light in the WIDC. The performance for TE polarized light is poor.

Figure 8:
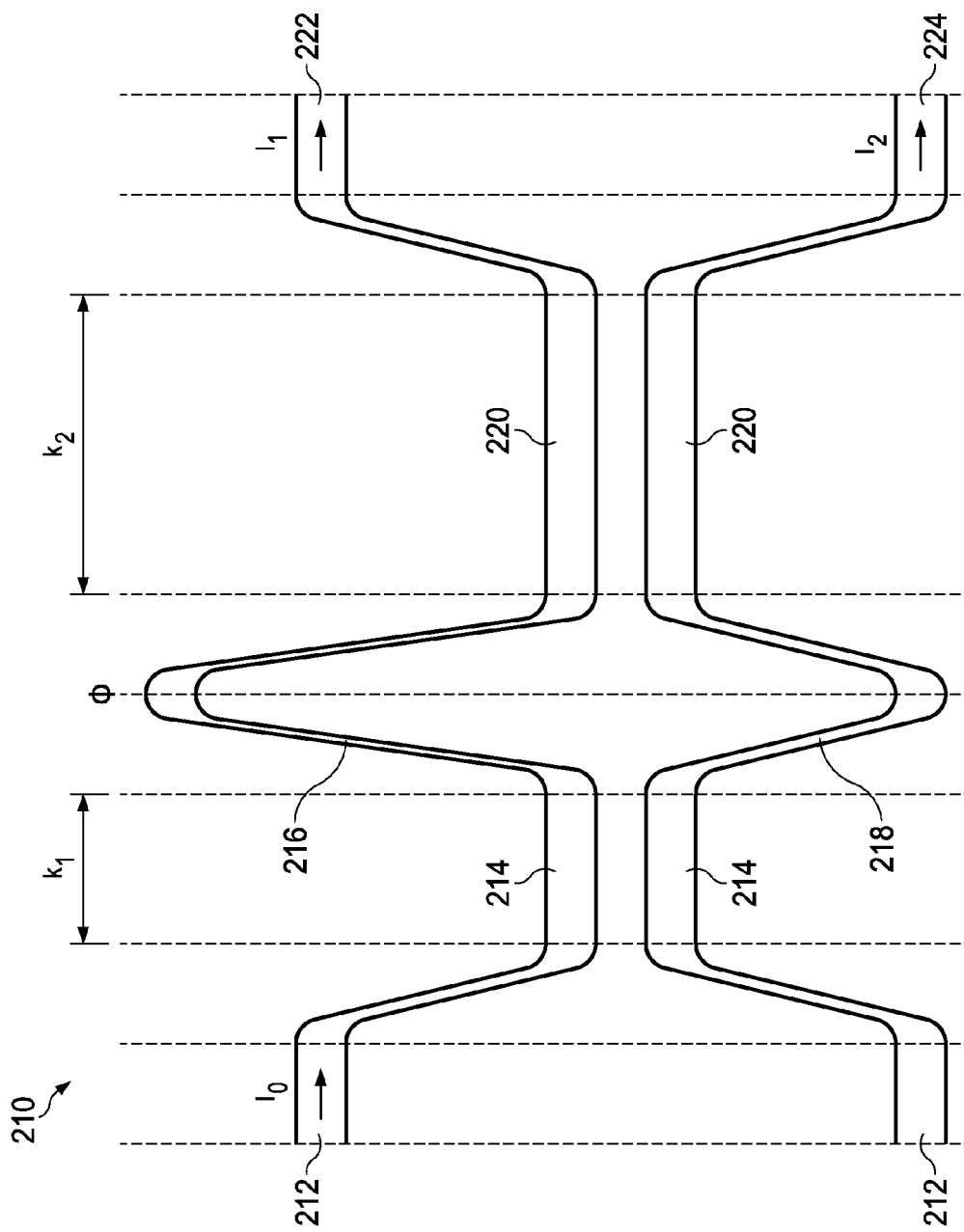
FIG. 8 illustrates an embodiment polarization and wavelength insensitive directional coupler.

FIG. 8 illustrates directional coupler 210 which is optimized for both TE polarized light and TM polarized light over a wavelength range. Light $I_0$ is input to input port 212, while light is not received by input port 212. The light proceeds through directional coupler 214, which has a coupling length of $k_1$.

The light is split between leg 216 and leg 218. The light propagating along the two legs experiences a phase shift of φ relative to each other. To obtain a phase shift, the two legs may have a different length or a different refractive index, causing them to have a different optical path length. A difference in refractive index may come from a difference in doping.

The phase shifted light in the legs is combined by directional coupler 220, which has a coupling length $k_2$. It exits through output 222 and/or output 224. The values of $k_1$, $k_2$, and φ may be adjusted to have good performance for TE polarized light and TM polarized light.

The coupling ratio is not just a function of wavelength, but is given by:

$$\frac{I_1(\lambda)}{I_0} = \cos^2\left(\frac{\beta(\lambda)\varphi}{2}\right)\sin^2\left(\frac{\pi}{2L_C(\lambda)}(k_1+k_2)\right) + \sin^2\left(\frac{\beta(\lambda)\varphi}{2}\right)\sin^2\left(\frac{\pi}{2L_C(\lambda)}(k_1-k_2)\right),$$

where β is the propagation constant, $L_c$ is the coupling length, and $I_1$ and $I_0$ are the output and input intensities in the waveguides.

Directional coupler 210 may be based on silicon photonic waveguides. Other materials with significant birefringence, such as InP, and other materials in the compound semiconductor family, including the II-g InGaAsP and AlGaAs may be used. When silicon is used, fabrication may be performed in a complementary metal oxide semiconductor (CMOS) silicon wafer environment, facilitating low costs.

Figure 9:
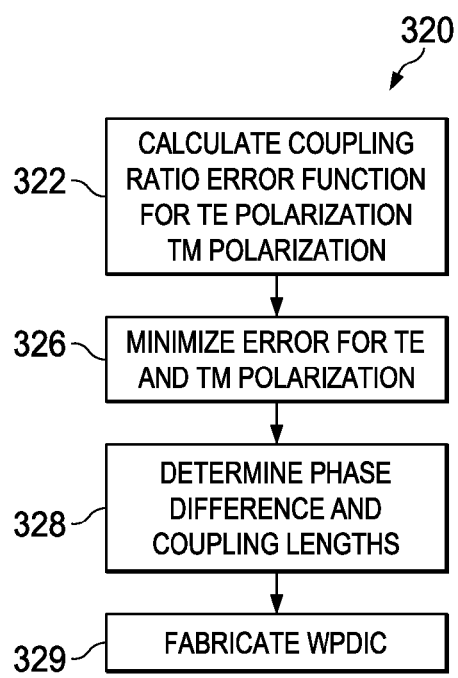
FIG. 9 illustrates a flowchart for an embodiment method of designing a polarization and wavelength insensitive directional coupler.

FIG. 9 illustrates flowchart 320 for a method of designing a directional coupler. The independent variables $k_1$, $k_2$, and φ may be selected for good performance across polarizations for a wavelength range. In step 322, the coupling ratio error function is calculated for TE polarization and TM polarization. The error function is given by:

$$\text{Error} = \int_{\min \text{wavelength}}^{\max \text{wavelength}} \left(\frac{I_1(\lambda)}{I_0} - 0.5\right)^2 d\lambda.$$

The error function may be integrated over the desired wavelengths. For example, in the 1310 nm waveband, the minimum wavelength may be 1260 nm and the maximum wavelength 1360 nm. In another example, the minimum wavelength is 1500 nm and the maximum wavelength is 1600 nm.

In step 326, the error function is minimized for both the TE polarization and TM polarization. An algorithm is applied to both the TE and TM modes of a waveguide in a separate optimization. Results are shown in Table 1. The lengths are iterated with 10 nm steps. A center wavelength of 1310 nm is used in this function. A waveguide with a height of 220 nm, a width of 340 nm, and rib height of 50 nm is used.

TABLE 1

|         | $k_1/L_c$ (1310 nm) | $k_2/L_c$ (1310 nm) | Φβ (1310 nm) |
|---------|---------------------|---------------------|--------------|
| TE mode | 0.48                | 1                   | 0.63 π       |
| TM mode | 0.53                | 1                   | 0.68 π       |

There exists an ideal phase difference and coupling ratios to produce an optimally flat wavelength response regardless of the polarization mode. These are determined in step 328. The small difference between the TE and TM parameters are a result of the different wavelength dependencies of φ and $L_c$ between the two modes.

Figure 10:
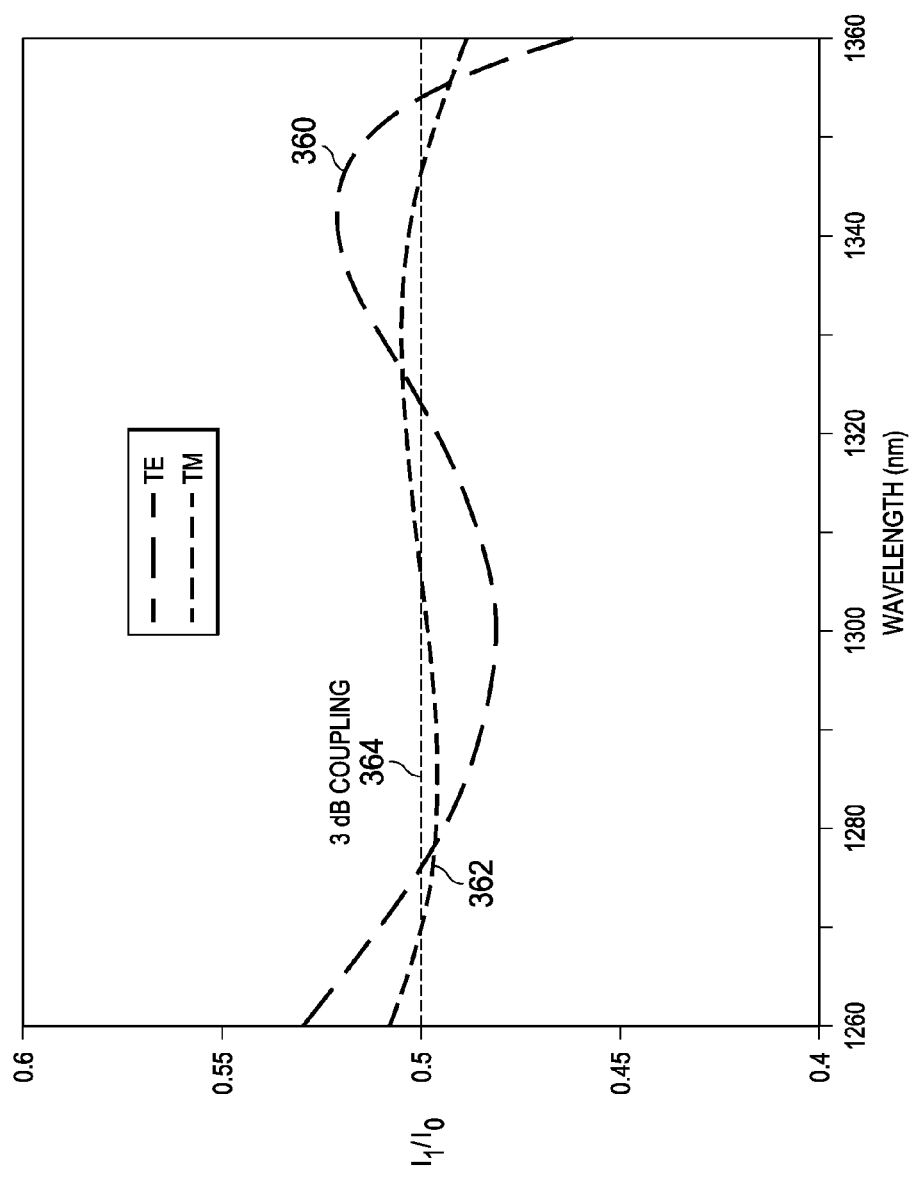
FIG. 10 illustrates a graph of the coupling ratio versus wavelength for wavelength insensitive directional couplers optimized separately for TE polarized light and TM polarized light.

This coupling response is plotted in FIG. 10. Curve 360 shows the results for TE mode, curve 362 shows the results for TM mode, and curve 364 shows the line for 3 dB coupling.

Figure 11:
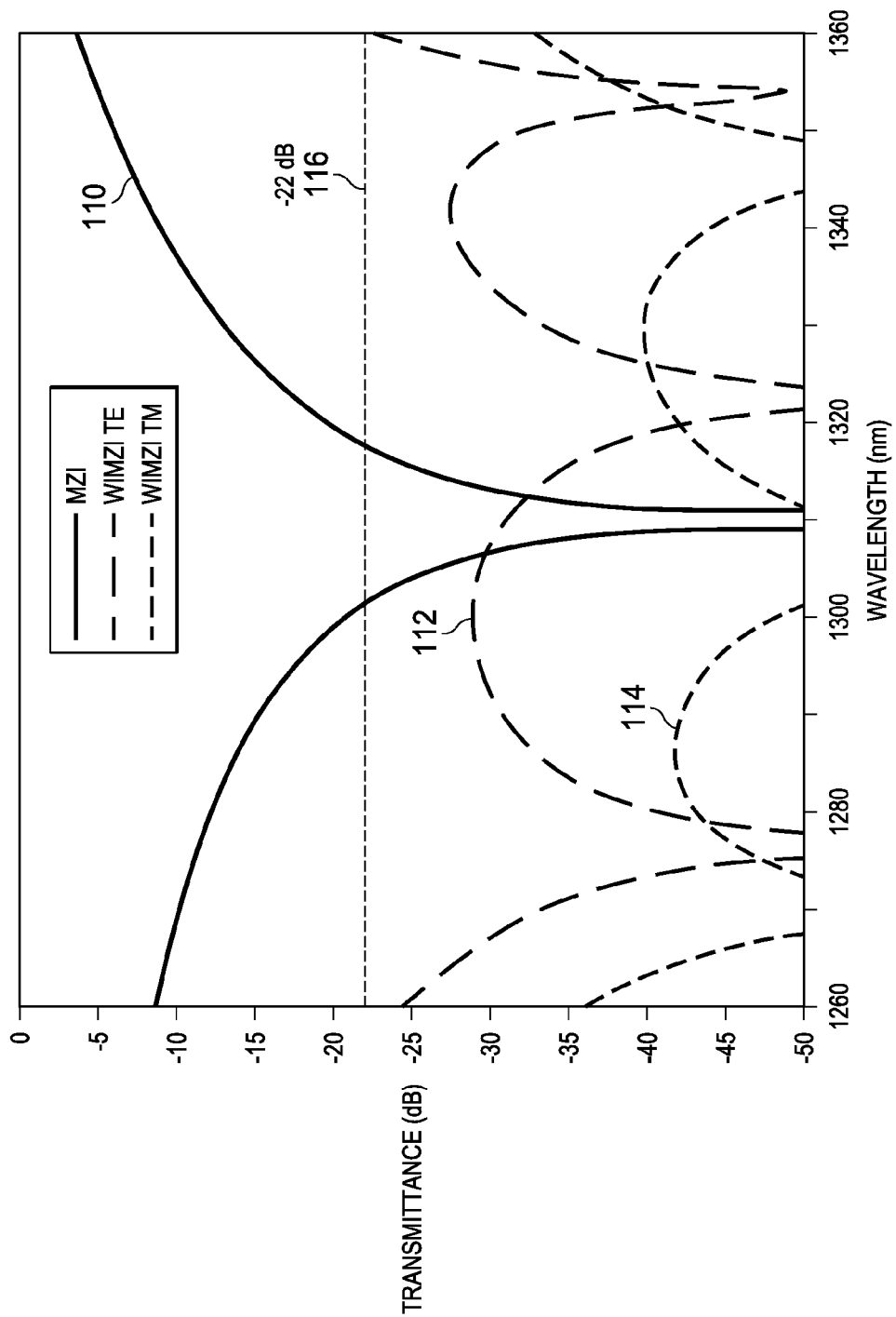
FIG. 11 illustrates a graph of transmittance versus wavelength for a wavelength insensitive Mach-Zehnder interferometer optimized separately for TE polarized light and TM polarized light.

FIG. 11 illustrates a combination of two WIDCs in a point-symmetrical configuration yielding the state response of a WIMZI. Curve 110 shows transmittance for a Mach-Zehnder interferometer, curve 112 shows the transmittance for TE mode in a WIMZI optimized for TE, curve 114 shows transmittance for TM mode in a WIMZI optimized for TM, and curve 116 shows −22 dB. The cross-state is defined as light exiting from the opposite waveguide in which it entered, where the bar-state is light emitting from the same waveguide it entered. In an off Mach-Zehnder interferometer, the light exits through the cross-state, and any light leaving through the bar-state is cross-talk. When compared to the Mach-Zehnder switch, the WIMZI has improved bandwidth for both TE and TM modes in the off state.

The results indicate a similar coupling for TE and TM modes at each directional coupler, and a similar phase difference between them. When designing in SOI, due to the strong refractive index it is common for the birefringence to be on the order of $10^{-1}$. This makes matching the phase difference for TE and TM modes by a stretch of waveguide problematic. Also, due to the difference in mode profiles, very different coupling lengths may be found. Matching beat lengths may be used to in a single length of directional coupler that couples TE and TM modes as desired, but this may not work well for a large bandwidth. Alternatively, selection of waveguide widths may be used to define directional couplers with similar coupling lengths for both polarizations.

Figure 12:
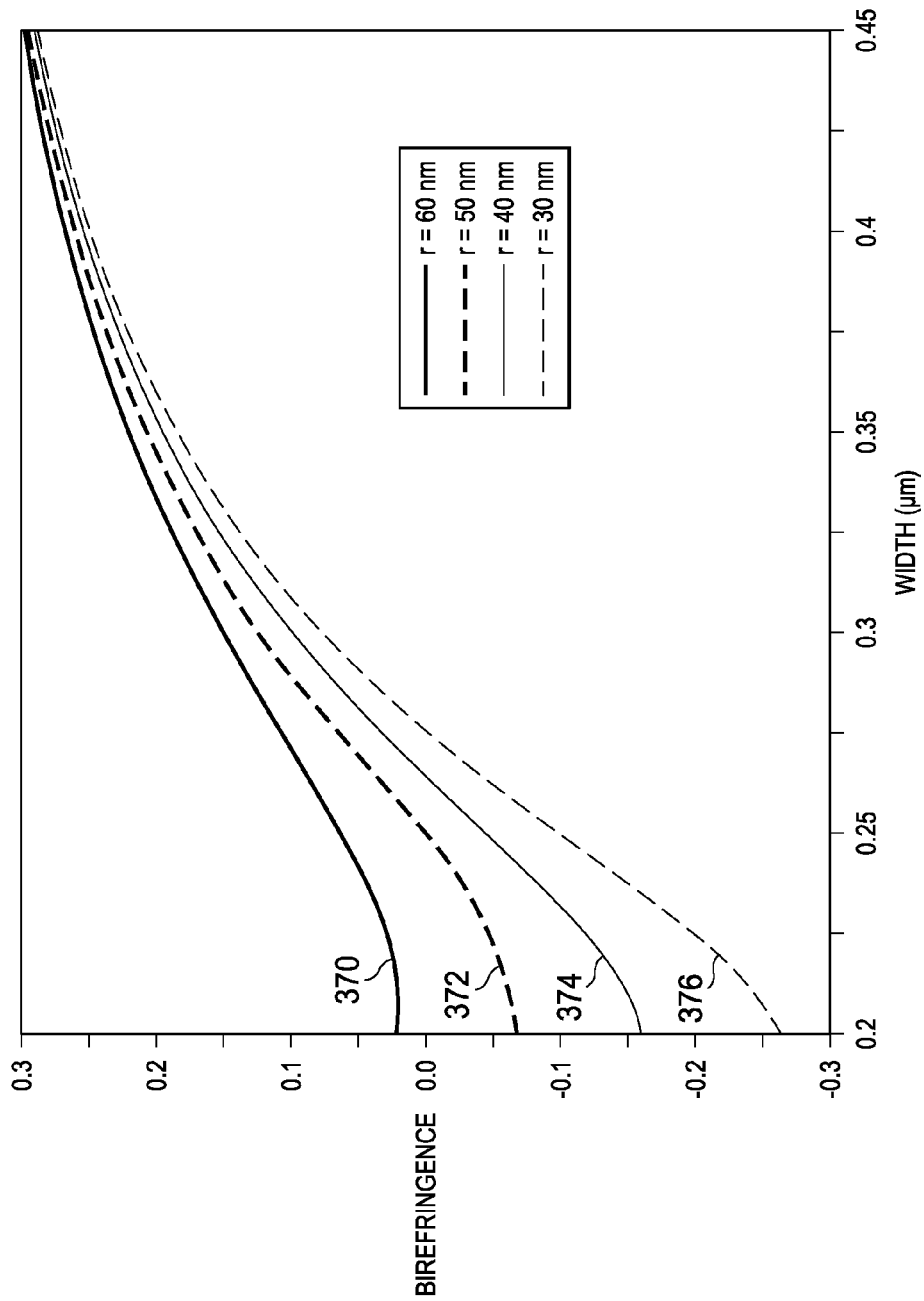
FIG. 12 illustrates a graph of birefringence versus waveguide width for an optical waveguide.

In one example, the width, height, and rib height of the waveguides are varied to produce a desired response. FIG. 12 shows the birefringence of a waveguide with a height of 280 nm for different varies of width and rib height. The x axis illustrates the width in μm, curve 370 illustrates the birefringence for r=60 nm, curve 372 shows the birefringence for r=50 nm, curve 374 shows the birefringence for r=40 nm, and curve 376 shows the birefringence for r=30 nm. There are several non-birefringent values. For example, a rib height of 50 nm and a width of 250 nm, a rib height of 40 nm and a width of 260 nm, or a rib height of 30 nm and a width of 270 nm may be used. In one example, a rib with a height of 50 nm and a width of 250 nm is selected. The coupling lengths in the corresponding directional couplers with a waveguide separation of 300 nm are 11.9 µm for the TE mode and 18.2 µm for the TM mode at a wavelength of 1310 nm. This design is optimized for a WIMZI configuration (called WIMZI-A) by minimizing the error functions for both TE and TM modes simultaneously.

Figure 13:
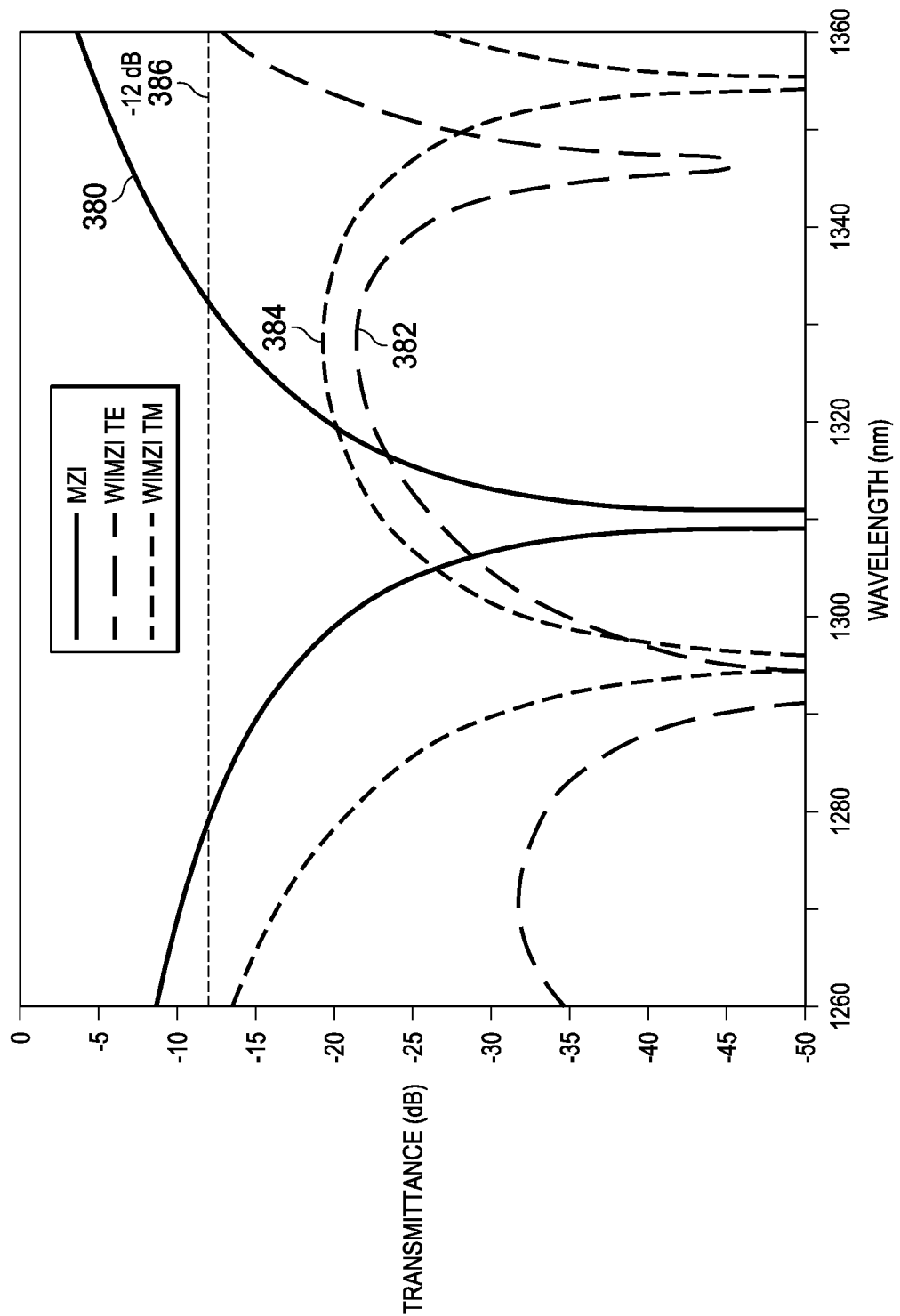
FIG. 13 illustrates a graph of transmittance versus wavelength for a wavelength insensitive Mach-Zehnder interferometer.

The off, bar state transmittance results are illustrated by FIG. 13. Curve 380 shows the transmittance for a Mach-Zehnder interferometer, curve 382 shows the transmittance for WIMZI-A TE mode, curve 384 shows the transmittance for WIMZI-A TM mode, and curve 386 shows a −12 dB transmittance. A crosstalk level of −12 dB is maintained over the entire waveguide.

Figure 14:
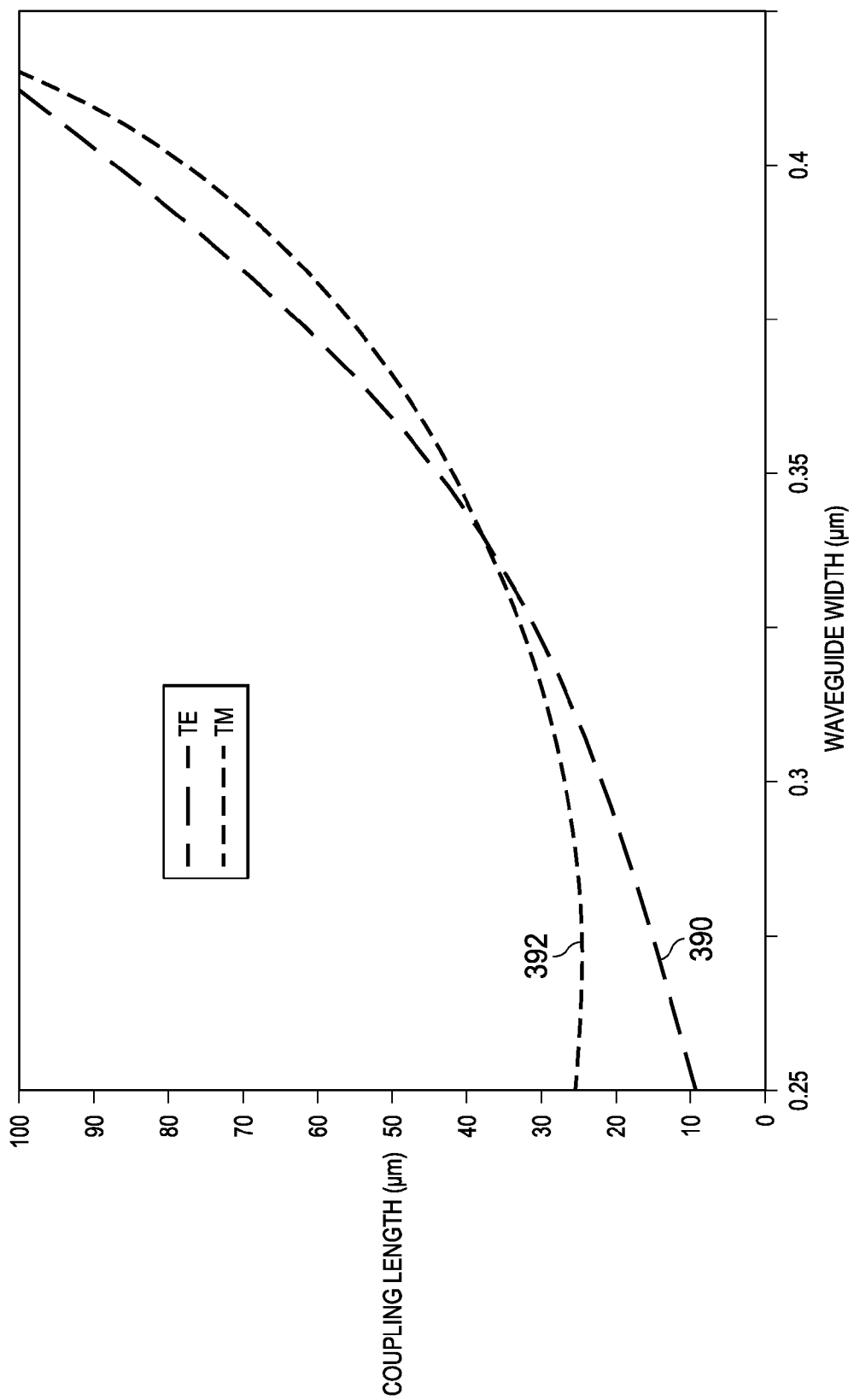
FIG. 14 illustrates a graph of coupling length versus waveguide width for an optical waveguide.
Figure 15:
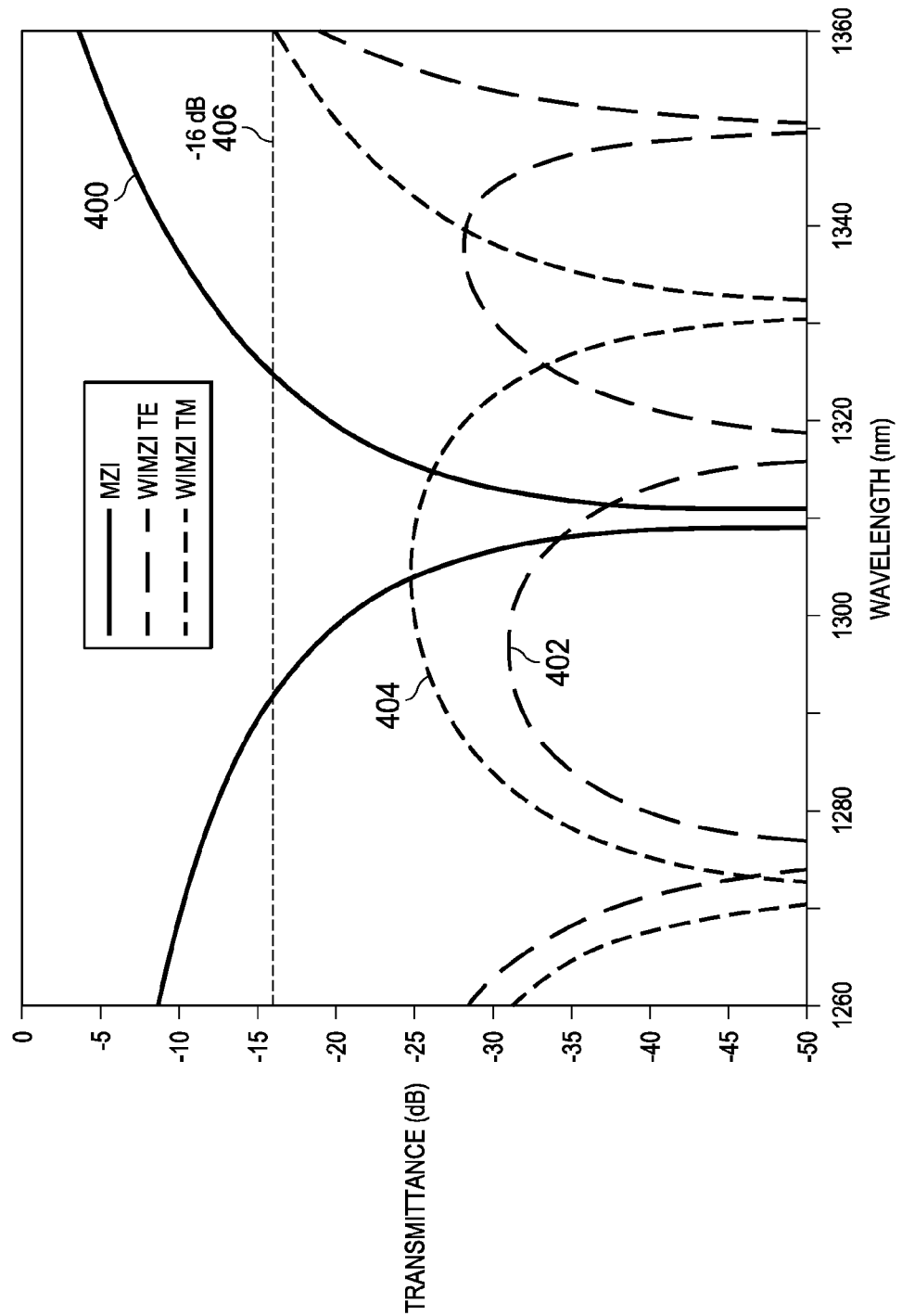
FIG. 15 illustrates a graph of transmittance versus wavelength for a wavelength insensitive Mach-Zehnder interferometer.

In another example waveguide, values of $L_c$ are found to match for TE and TM modes. The height is set to 220 nm with a rib height of 50 nm, while the width is varied. FIG. 14 illustrates the coupling length, in µm, as a function of waveguide width in µm for TE mode (curve 390) and TM mode (curve 392). In the directional coupler, a separation between waveguides of 300 nm is found. A width of 340 nm has an approximately equal $L_c$ for both polarization modes. The birefringence of this structure is $5 \times 10^{-1}$. This configuration is known as the WIMZI-2 device, which is designed after optimization for both polarizations simultaneously. FIG. 15 illustrates the off, bar-state transmittance for WIMZI-B. Curve 400 shows the transmittance for a Mach-Zehnder interferometer, curve 402 shows the transmittance for TE mode, curve 404 shows the transmittance for TM mode, and curve 406 shows a −16 dB transmittance. There is a 4 dB reduction in crosstalk compared with WIMZI-A, for a crosstalk level of −16 dB. The directional couplers are designed to be polarization independent. In the WIMZI-2 design, $k_1$=20.39 µm, $k_2$=41.26 µm, and φ=0.17 µm.

Finally, in step 329, a WPIDC is designed and fabricated with the desired coupling lengths and phase shift. The fabrication may be done in a CMOS fabrication facility.

Figure 16:
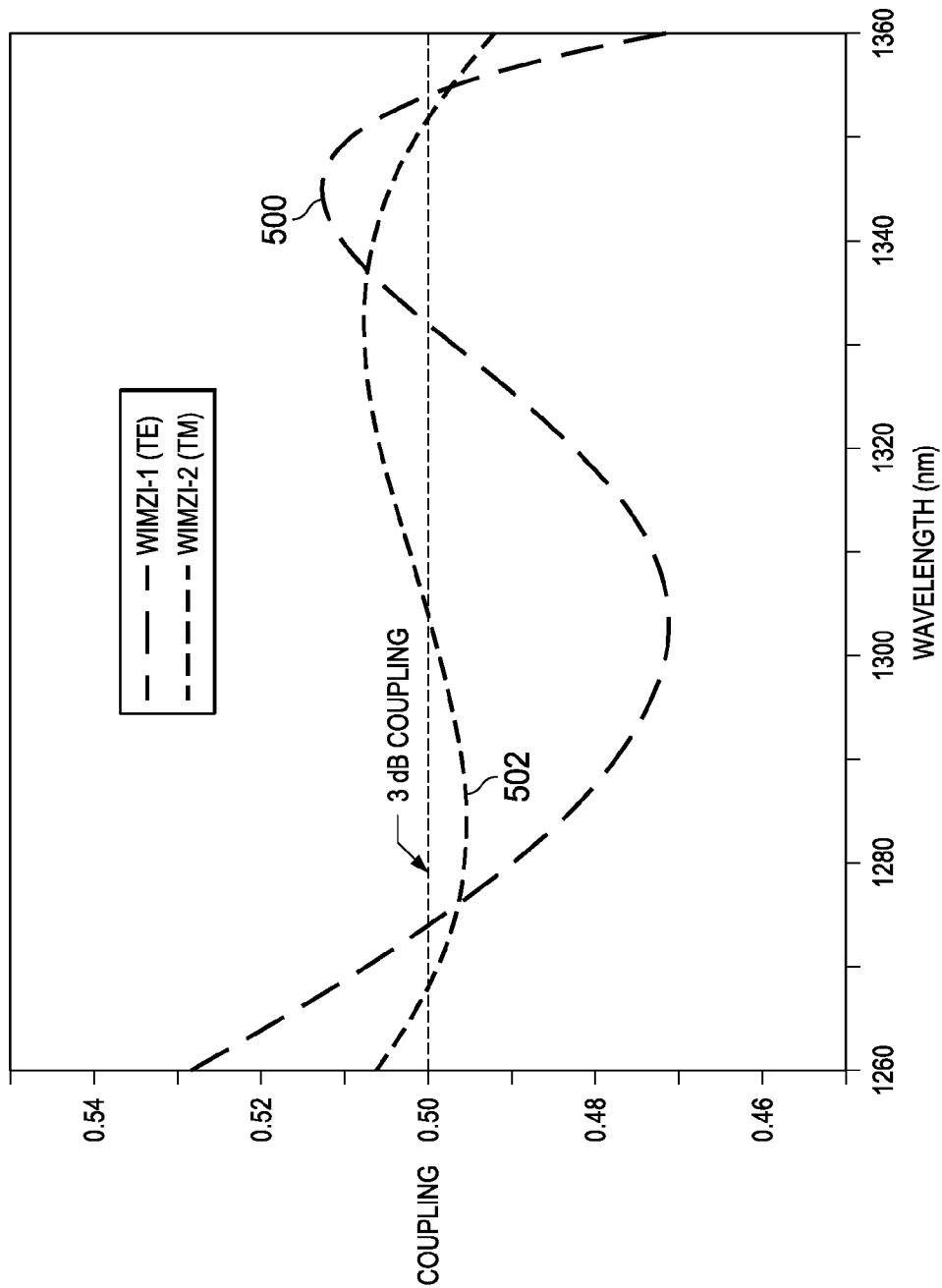
FIG. 16 illustrates a graph of coupling versus wavelength for a directional coupler.

Table 2 illustrates the optimized WIDC parameters for WIMZI-1 and WIMZI-2 devices at the center wavelength, 1310 nm. Each device is designed for a different operating polarization. The values of β and $L_c$ as a function of λ were found for a waveguide with H=220 nm, W=340 nm, and r=50 nm. There may be good phase differences and coupling ratios to produce a flat wavelength response regardless of polarization mode. The small differences between the TE and TM parameters stem from the different wavelength dependencies of φ and $L_c$ between the two modes. FIG. 16 illustrates the coupling response for WIMZI-1 (curve 500) and WIMZI-2 (curve 502).

TABLE 2

| | Optimal Polarization | $\frac{k_1}{L_c(1310\ nm)}$ | $\frac{k_2}{L_c(1310\ nm)}$ | φ · β (1310 nm) |
|---|---|---|---|---|
| WIMZI-1 | TE | 0.48 | 0.98 | 0.63 |
| WIMZI-2 | TM | 0.53 | 1.05 | 0.68 |

Figure 17:
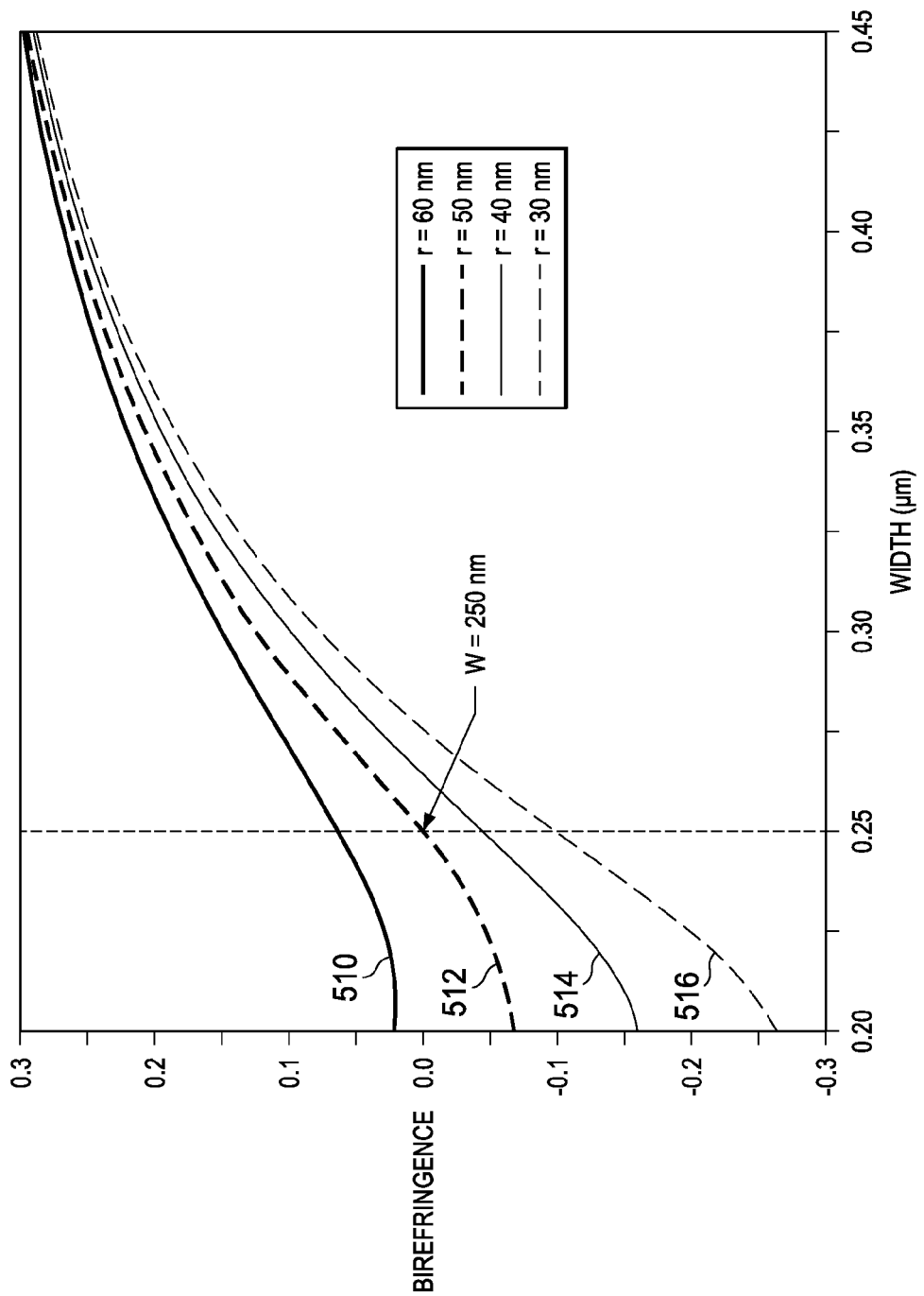
FIG. 17 illustrates a graph of birefringence versus waveguide width for an optical waveguide.

FIG. 17 illustrates the birefringence of a waveguide with H=280 nm for different values of r and W. The graph shows the birefringence as a function of W, where r=30 nm for curve 510, r=40 nm for curve 512, r=50 nm for curve 514, and r=60 nm for curve 516. A design which minimizes birefringence is r=50 nm and W=250 nm. The coupling length in the corresponding directional coupler with a waveguide separation of 300 nm is 11.9 µm for the TE mode and 18.2 µm for the TM mode at a wavelength of 1310 nm. This design is optimized by minimizing the error function in both TE and TM modes simultaneously, and is known as WIMZI-3.

Figure 18:
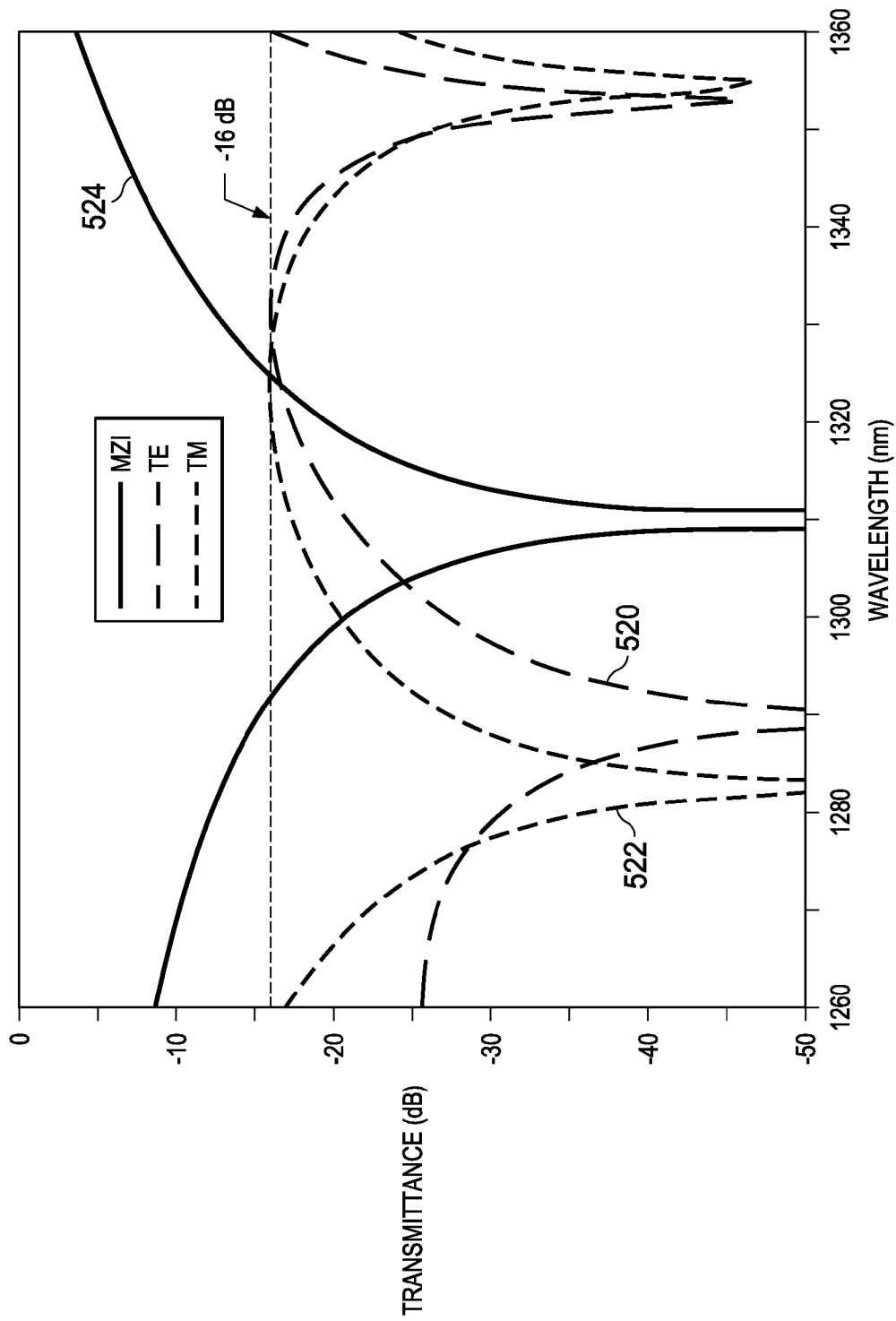
FIG. 18 illustrates a graph of transmittance versus wavelength for a wavelength insensitive Mach-Zehnder interferometer.

FIG. 18 illustrates a graph of transmittance versus wavelength for WIMZI-3 in TE mode (curve 520), TM mode (curve 522), and for a Mach-Zehnder interferometer (curve 524). This is the off, bar-state transmittance. The performance is −16 dB over the transmission range.

Figure 19:
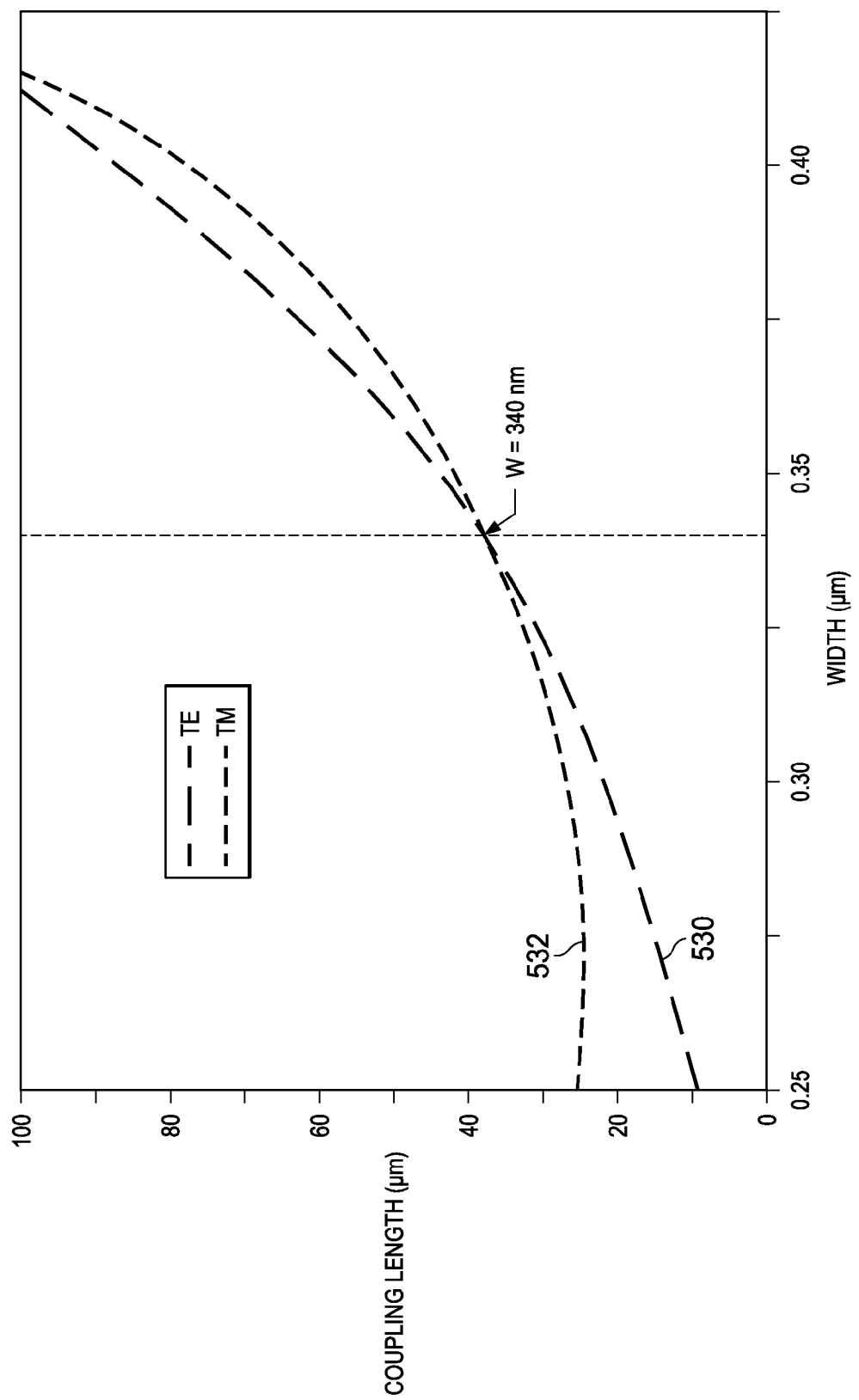
FIG. 19 illustrates a graph of coupling length versus waveguide width for an optical waveguide.

In another example, the values of $L_c$ were found to match for TE and TM modes. The parameters of H=220 nm and r=50 nm are set, while r is varied, as shown in FIG. 19. The coupling length versus width is plotted for TE polarization (curve 530) and TM polarization (curve 532). A value of W=340 returns a directional coupler with coupling lengths approximately equal for both polarizations. The birefringence is $5 \times 10^{-1}$. This configuration is known as WIMZI-4 when it is optimized for both parameters. The optimized parameters are $k_1$=21.24 µm, $k_2$=41.50 µm, and φ=0.17 µm.

Figure 20:
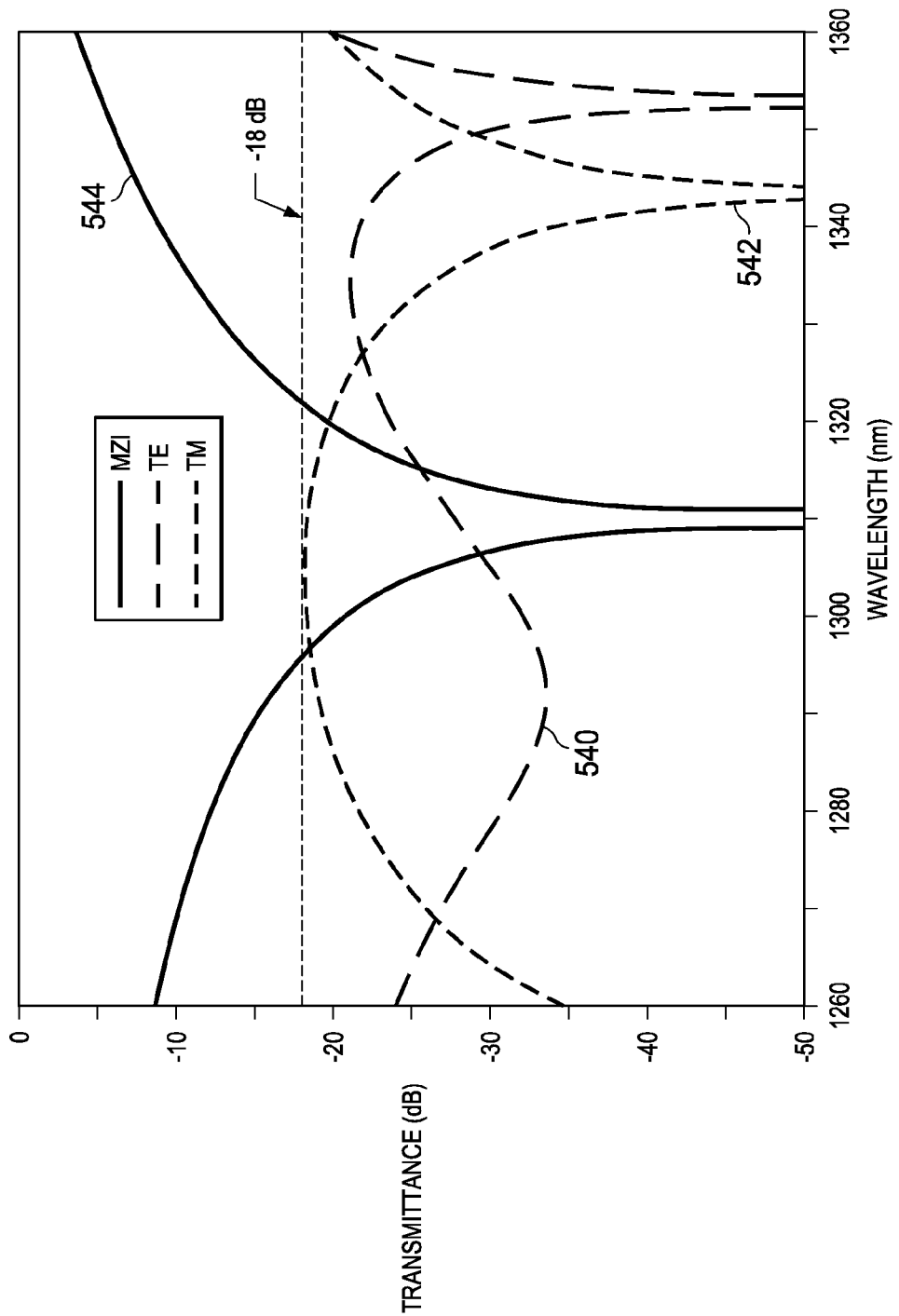
FIG. 20 illustrates a graph of transmittance versus wavelength for a wavelength insensitive Mach-Zehnder interferometer.

The off, bar-state transmittance of WIMZI-4 is illustrated by FIG. 20. Curve 540 shows the TE transmittance, curve 542 shows the TM transmittance, and curve 544 shows the MZI interference. There is a 2 dB reduction in crosstalk compared to WIMZI-4. Matching the coupling lengths is important. The crosstalk is less than −18 dB.

Figure 21:
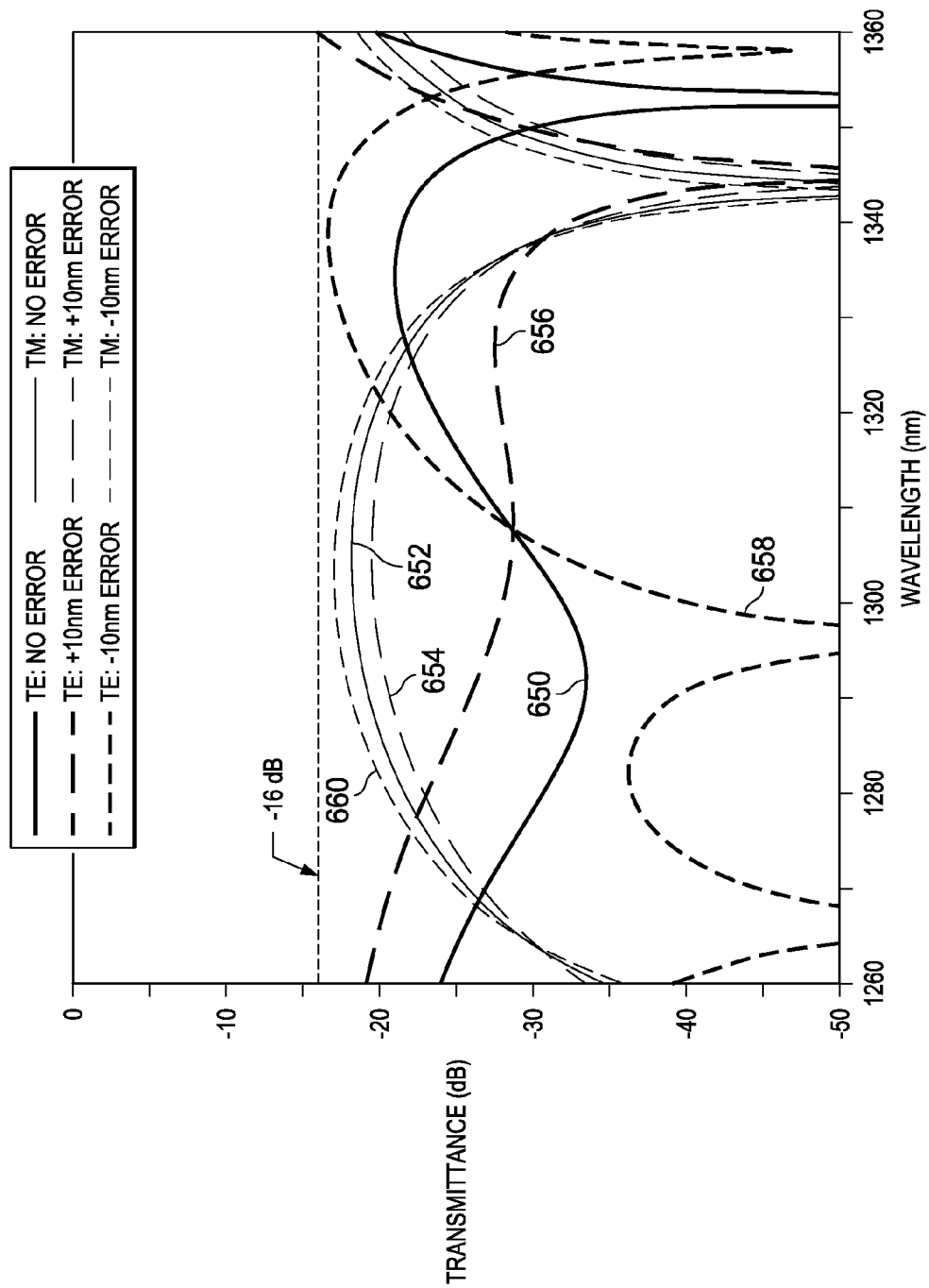
FIG. 21 illustrates a graph of crosstalk versus wavelength with fabrication errors.

Fabrication errors exist in realizing a design. In SOI, small perturbations in waveguide width and other parameters may have a large effect on device performance. Errors may be on the order of 10 nm. FIG. 21 illustrates a graph of transmittance versus wavelength for WIMZI-4 with errors. Curve 650 shows TE polarization with no error, curve 652 shows TM polarization with no error, curve 654 shows TE polarization with +10 nm error, curve 656 shows TM polarization with +10 nm error, curve 658 shows TE polarization with −10 nm error, and curve 660 shows TM polarization with −10 nm error. The length of the phase shifting region φ is varied in both directions. When φ=180 nm, the crosstalk reaches −16 dB.

Figure 22:
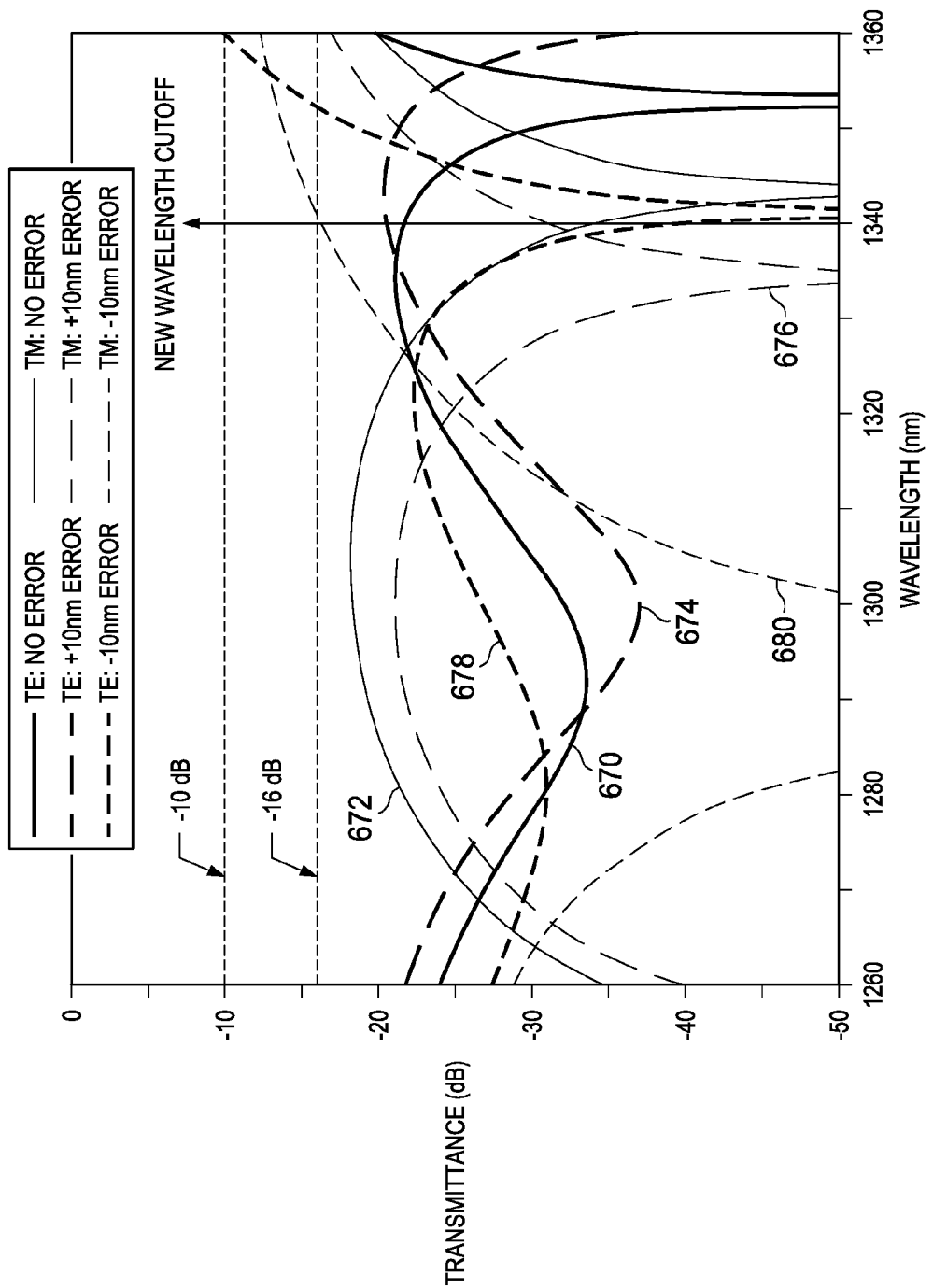
FIG. 22 illustrates another graph of crosstalk versus wavelength with fabrication errors.

In another example, the width of the waveguides in the directional coupler regions is varied. The waveguide separation was changed by the negative of the waveguide width error. For instance, when W=350 nm, the spacing is modeled as 290 nm. These results are illustrated in FIG. 22. Curve 670 shows TE polarization with no error, curve 672 shows TM polarization with no error, curve 674 shows TE polarization with +10 nm error, curve 676 shows TM polarization with +10 nm error, curve 678 shows TE polarization with −10 nm error, and curve 689 shows TM polarization with −10 nm error, for WIMZI-4. The crosstalk degrades to −10 dB for −10 nm error. Restricting the wavelength range to 1260-1340 nm maintains a −16 dB level. This result is known as WIMZI-5.

The WPIDC has low crosstalk over a wavelength range. The crosstalk may be below −10 dB, −15 dB, −20 dB, −25 dB, −30 dB, −35 dB, or −40 dB over the wavelength range. The wavelength range may be 20 nm, 30 nm, 40 nm, 50 nm, 60 nm, 70 nm, 80 nm, 90 nm, or 100 nm.

In a Mach-Zehnder interferometer in the on state, the effects of the 3 dB couplers are cancelled out by each other to the π phase shift induced in one arm of the device through carrier injection. The WIDCs cannot address wavelength or polarization dependence problems in this state, and there is minimal wavelength dependence in the on state. However, there is considerable polarization dependence due to the large differences in confinement factors ($\Gamma$) between the TE and TM modes. This results in different phase shifts ($\theta$) in the carrier injection region of fixed length $L_p$, which is:

$$\theta(\lambda) = \frac{2\pi}{\lambda} \Gamma \Delta n L_p.$$

Figure 23:
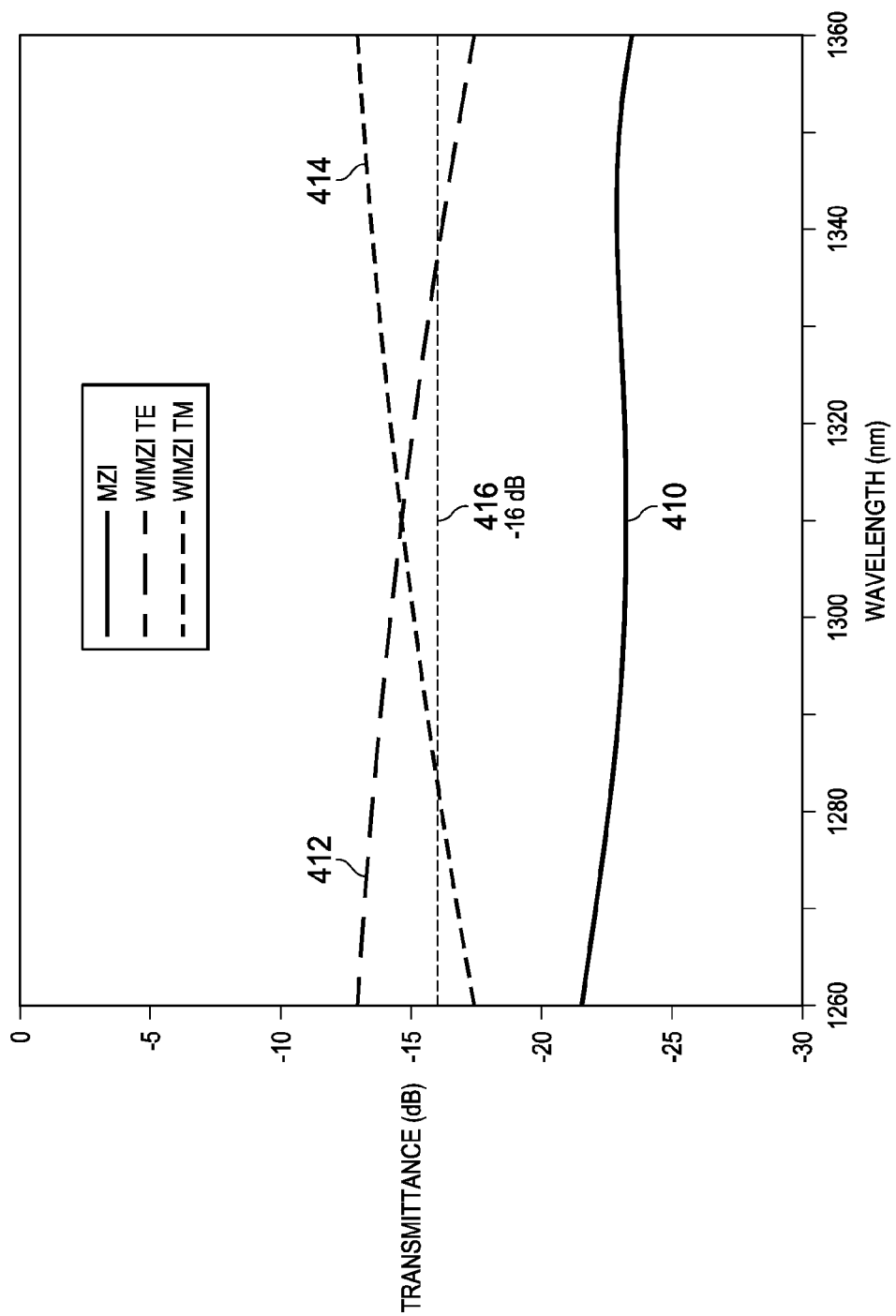
FIG. 23 illustrates a graph of transmittance versus wavelength for a wavelength insensitive Mach-Zehnder interferometer.

In some WIMZI waveguides, $\Gamma_{TE}$ is about 0.77 and $\Gamma_{TM}$ is about 0.60. The on, cross-state transmittance of the WIMZI is shown in FIG. 23. Curve 410 shows the transmittance for a Mach-Zehnder interferometer, curve 412 shows the transmittance for TE mode in a WIMZI, curve 414 shows the transmittance for TM mode in a WIMZI, and curve 416 shows −16 dB. When the WIMZI is on, the output should be in the bar-state, and any light at the cross-state is cross-talk. In this device, the F used to calculate the phase shifter length is an average of F and $\Gamma_{TM}$. The WIMZI cross-talk is greater than that of the Mach-Zehnder interferometer for both polarizations. Also, the crosstalk does not stay below the −16 dB limit of the off WIMZI.

The carrier injection region is broken into two sections, and polarization rotators (PRs) are placed after each of these sections. Additional details on a region with two PRs after two sections are provided in U.S. patent application Ser. No. 13/955,449 filed on Jul. 31, 2013, and which application is hereby incorporated herein by reference. Each region is designated for the average of the TE and TM confinement factors. The phase shift of a mode in a new section is given by:

$$\theta(\lambda) = \pi \frac{1310 \text{ nm}}{\lambda} \frac{\Gamma}{\Gamma_{TE} + \Gamma_{TM}}.$$

The effect of this structure on the device response is that an incident TE mode will experience half of the phase shift. Then, the light is converted to the TM mode, where it experiences the second half of the phase shift. Finally, it is converted back into TE mode. A similar effect occurs in the incident TM mode, which experiences the first half of the phase shift, and is converted to TE mode, where it experiences the second half of the phase shift. Finally, it is converted back to TM mode.

Figure 24:
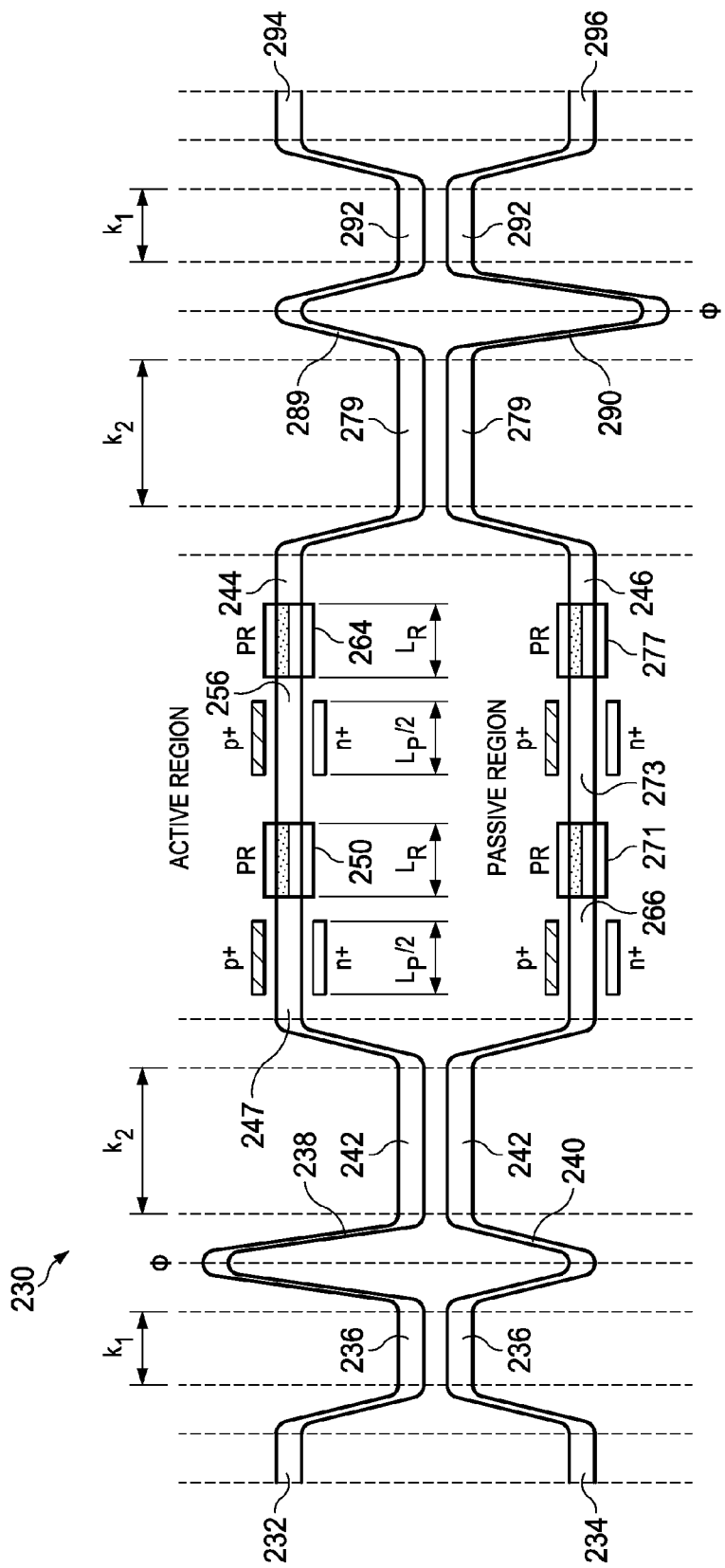
FIG. 24 illustrates an embodiment polarization and wavelength insensitive Mach-Zehnder interferometer.

FIG. 24 illustrates polarization and wavelength insensitive Mach-Zehnder interferometer (PWIMZI) 230. There is a directional coupler on both the input and output of the Mach-Zehnder interferometer. Light enters at input port 232, while input port 234 does not have light input. Directional coupler 236 has a coupling length of $k_1$. Then, leg 238 has a phase shift of $\phi$ relative to leg 240. Directional coupler 242 has a coupling length $k_2$.

The Mach-Zehnder interferometer has leg 246, a passive leg, and leg 244, an active leg. In another example, both legs are active. Leg 246 contains delay region 266, followed by polarization rotator 271. Next in leg 246 is delay region 273, followed by polarization rotator 277. Similarly, in leg 244, there is delay region 247, polarization rotator 250, delay region 256, and polarization rotator 264. Delay regions 247 and 256 are active, and are attached to electrodes. A voltage may be applied to the electrodes to adjust the refractive index, and therefore the optical path lengths, of these regions. The two phase shifting sections contain p+ and n+ doped ribs. The phase shifting sections and polarization rotators are mirrored in both regions. In the passive region the p+ and n+ electrodes are shorted, so they do not perform phase modulation. This is to balance the losses in the two legs to decrease crosstalk.

At the output of the Mach Zehnder interferometer, there is another directional, coupler which is a mirror image of the first directional coupler. Directional coupler 279 has a coupling length of $k_2$. Then, leg 290 has a phase shift of $\phi$ relative to leg 289. Also, directional coupler 292 has a coupling length of $k_1$. Finally, light exits through output ports 294 and/or output port 296.

In one example, the polarization rotators are etched corner designs. The device achieves a 92% conversion efficiency over a wavelength range of 120 nm with a length of 22.1 μm. In the rotation region, the two lowest order modes are fully hybridized. Fully hybridized modes have their optical axis angle ($\Phi$) at 45°. The rotation length ($L_r$) to convert one polarization to another is:

$$L_r(\lambda) = \frac{\lambda}{2(n_0 - n_1)},$$

where $n_0$ and $n_1$ are the effective indexes of the first and second order modes in the waveguide, respectively. The polarization conversion efficiency (PCE) can be defined as:

$$PCE(\lambda) = \sin^2(2\Theta)\sin^2\left(\frac{\pi l}{2L_R(\lambda)}\right),$$

where l is the length of the polarization rotator.

Figure 25:
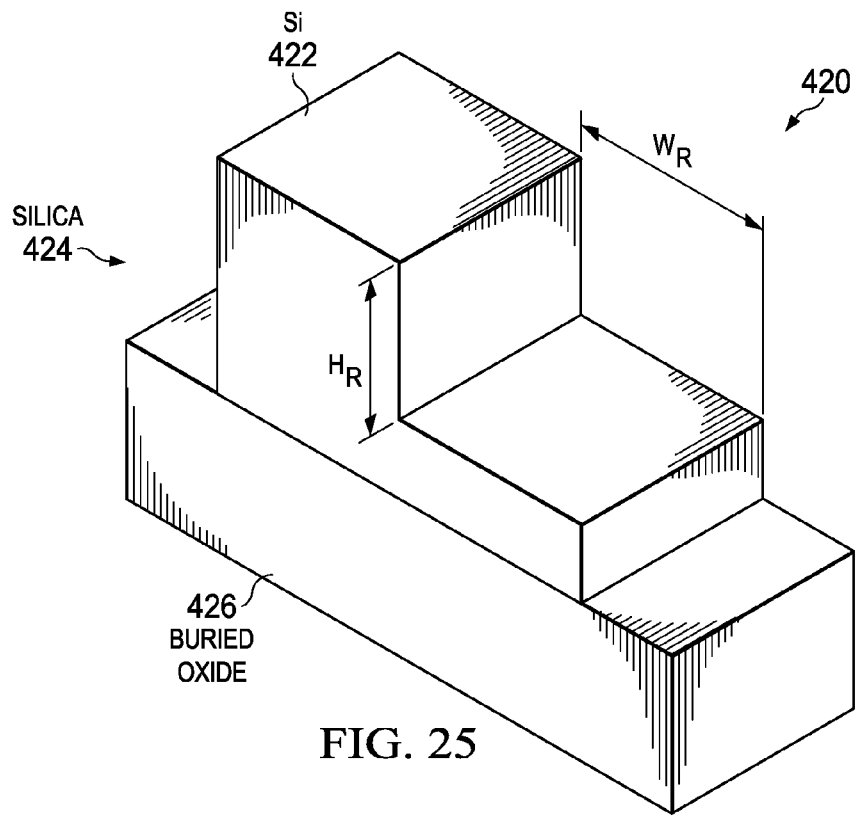
FIG. 25 illustrates an embodiment polarization rotator.

FIG. 25 illustrates polarization rotator 420, which contains silicon waveguide 422 in air 424 over buried oxide 426, for example silicon dioxide. The ribs are etched away with an etched corner of height $H_R$=170 nm and a width $W_R$=190 nm. A silica cladding is also applied. $L_R$=4.8 μm for two fully hybridized modes.

Figure 26A:
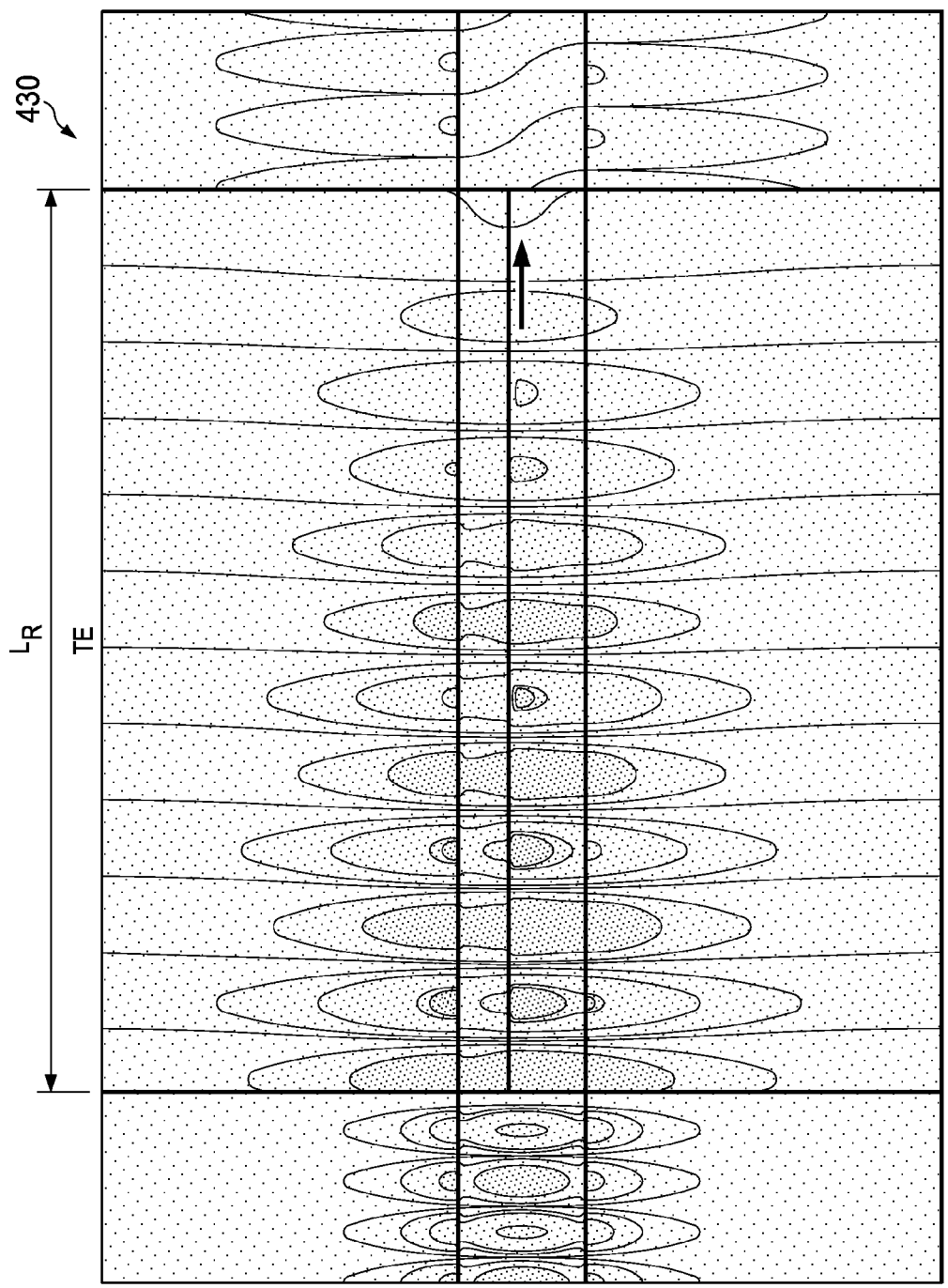
FIGS. 26A-B illustrate simulations of a polarization rotator with incident TE polarized light.
Figure 26B:
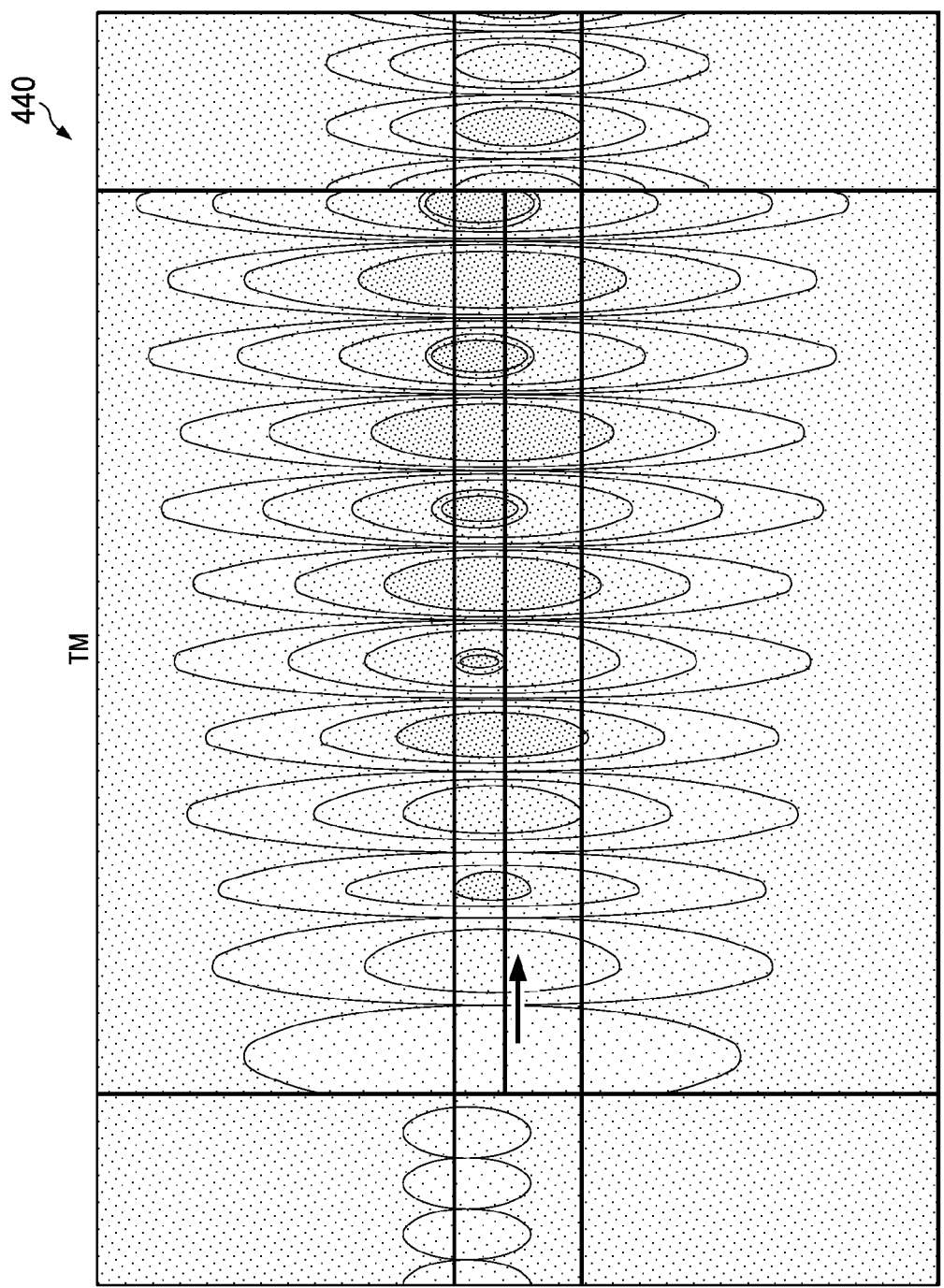

FIGS. 26A-B illustrate propagation simulations of the polarization rotator illustrated in FIG. 25. When TE light is incident, FIG. 26A illustrates TE mode 430, while FIG. 26B illustrates TM mode 440. The TE mode light is almost completely converted to TM mode.

Figure 27:
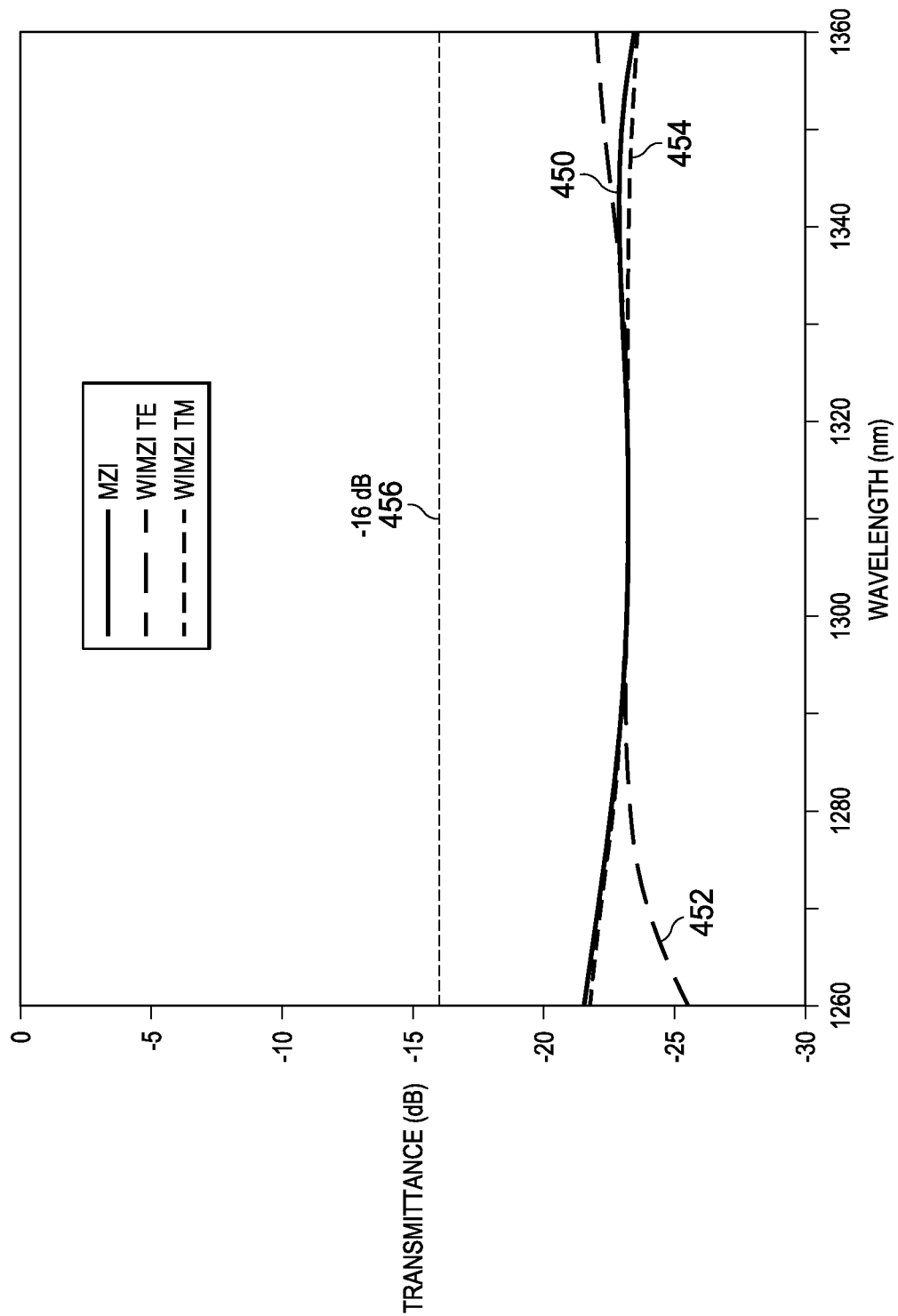
FIG. 27 illustrates a graph of transmittance versus wavelength for a polarization and wavelength insensitive Mach-Zehnder interferometer.

FIG. 27 illustrates the crosstalk in an on-state PWIMZI. Curve 450 shows the crosstalk for a Mach-Zehnder interferometer, curve 452 shows the TE mode crosstalk for a PWIMZI, curve 454 shows the TM mode crosstalk for a PWIMZI, and curve 456 shows a crosstalk of −16 dB. Both the TE and TM crosstalk is reduced well below −16 dB. The TE and TM crosstalk nearly matches the crosstalk for a Mach-Zehnder interferometer designed for only one polarization.

Figure 28:
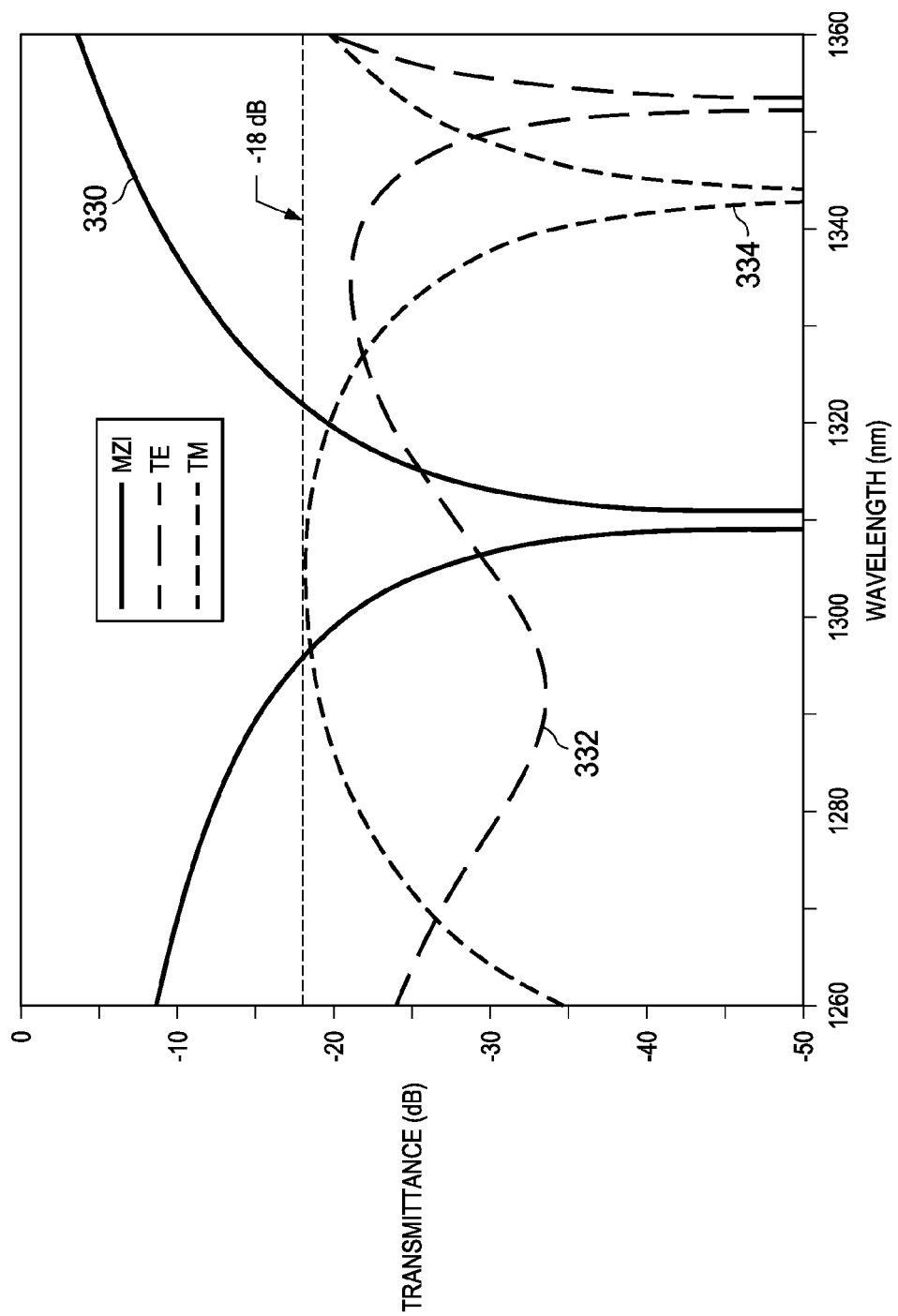
FIG. 28 illustrates a graph of transmittance versus wavelength for a polarization and wavelength insensitive Mach-Zehnder interferometer.

FIG. 28 illustrates a graph of the transmittance versus wavelength for a Mach-Zehnder interferometer (curve 330), for TE polarization in a PWIMZI (curve 332), and for TM polarization in a WIMZI (curve 334). The crosstalk stays below −18 dB for the range of wavelengths from 1260 nm to 1360 nm.

Figure 29:
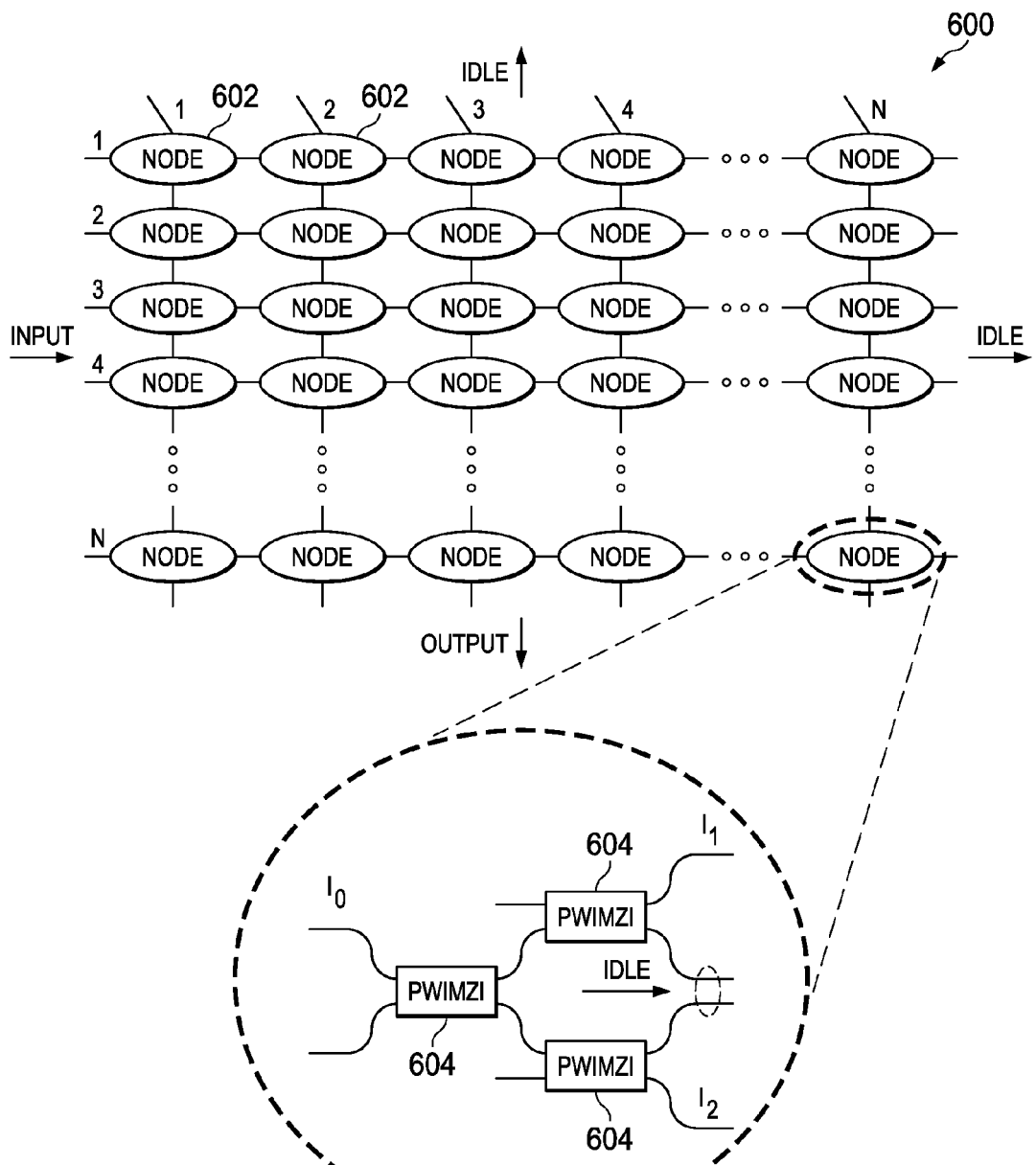
FIG. 29 illustrates a crossbar switching fabric.

Many channels are handled at a single switching center. Therefore, it is desirable for an optical switch design to be scalable to large port counts. 2×2 switches such as the PWIMZI may be assembled into fabrics using a strictly non-blocking space switch architecture, such as the crossbar switch. FIG. 29 illustrates large scale switching fabric 600, a crossbar switch, containing nodes 602. A node contains PWMZIs 604. When integrating many PWIMZIs onto a single chip for large scale optical packet switching, the relatively high crosstalk level in the switch is a size limiting factor. Three PWIMZIs may be used in every 2×2 node to reduce crosstalk from −18 dB to −36 dB. In this structure, the outputs from one switch are fed directly into two separate PWIMZI switches. These act to direct crosstalk into two idle ports, leaving the signal in the output ports. With this decreased crosstalk level, the maximum port size (N may be calculated using:

$$SXR = -X - 10 \cdot \log(N-1).$$

X is the crosstalk at each node, and SSXR is the acceptable signal-to-crosstalk ration. Assuming SXR=20 dB, N=40. It is possible to use several PWIMZIs cascaded at each node to reduce the crosstalk level to the point where large port count fabrics may be used.

In the switching fabric, the light is launched on input ports 1-N. The signal may be switched to an output waveguide by changing one of the nodes form off to on, directing light through the bar-state. The crosstalk will be then directed to an idle port. Adding additional dummy nodes, the number of switches crossed for every optical path will be equal, equalizing loss.

Embodiments may be used for a variety of applications, including modulators, switches, multiplexers, demultiplexers, and other photonic devices where it is desirable to be optimized for multiple polarizations for a wavelength range.

Figure 30:
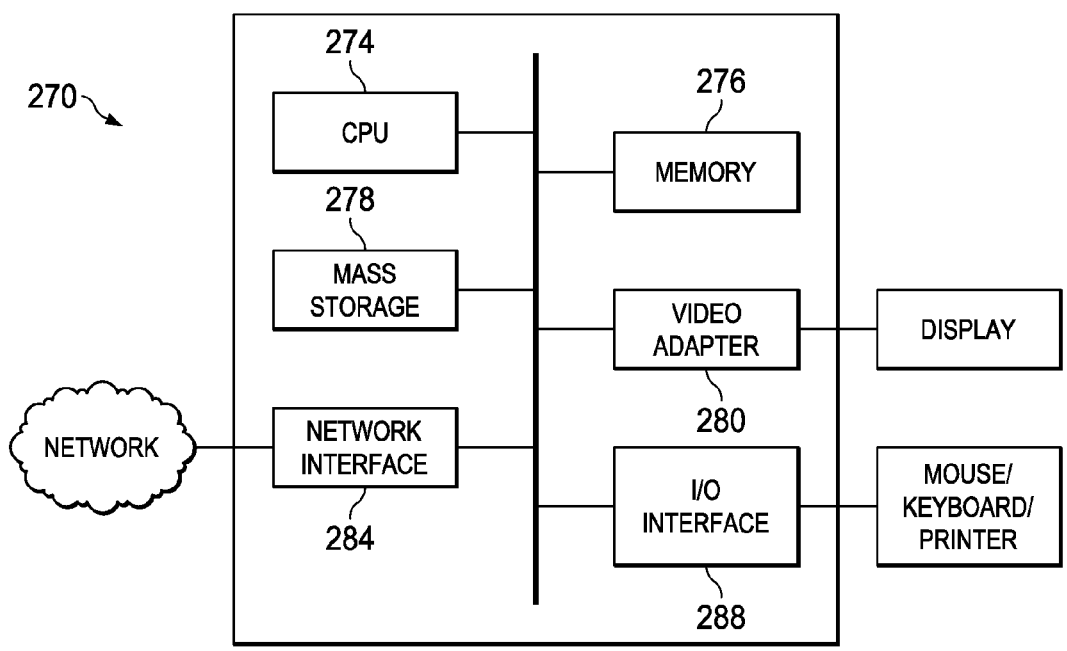
FIG. 30 illustrates a block diagram of an embodiment general-purpose computer system.

FIG. 30 illustrates a block diagram of processing system 270 that may be used for implementing the devices and methods disclosed herein. Processing system 270 may be used in designing a WPIDC. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An optical directional coupler comprising:
    an input terminal configured to receive an input optical signal;
    a first coupler optically coupled to the input terminal, wherein the first coupler has a first coupling length, wherein the first coupler is configured to couple a first portion of the input optical signal to a first leg and a second portion of the input optical signal to a second leg, wherein the first leg is configured to phase shift the first portion of the input optical signal to produce a first phase shift signal, wherein the second leg is configured to phase shift the second portion of the input optical signal to produce a second phase shift signal, and wherein the first phase shift signal has a phase difference relative to the second phase shift signal; and
    a second coupler configured to receive the first phase shift signal and the second phase shift signal and to output a first output optical signal to a first output, wherein the second coupler has a second coupling length, wherein a crosstalk of the input optical signal to a second output is below −15 dB for both transverse electrical (TE) polarized light and transverse magnetic (TM) polarized over a wavelength range spanning at least 40 nm, and wherein the second coupling length is within 10% of twice the first coupling length.

2. The optical directional coupler of claim 1, wherein the first coupling length is about 21.2 µm, wherein the second coupling length is about 41.5 µm, and wherein the phase difference is about 0.17 µm.

3. The optical directional coupler of claim 1, wherein the crosstalk of the input optical signal to the second output is below −15 dB, and wherein the wavelength range spans at least 100 nm.

4. The optical directional coupler of claim 1, wherein the wavelength range is from 1260 nm to 1360 nm.

5. The optical directional coupler of claim 1, wherein the first coupler comprises:
    a first silicon waveguide; and
    a second silicon waveguide separated from the first silicon waveguide by a separation of about 300 nm.

6. The optical directional coupler of claim 5, wherein the first silicon waveguide has a height of 220 nm, a width of 340 nm, and a rib height of 50 nm.

7. The optical directional coupler of claim 1, wherein the optical directional coupler is integrated on a silicon-on-insulator (SOI) substrate.

8. The optical directional coupler of claim 1, wherein the first leg has a first length, the second leg has a second length, and the first length does not equal the second length.

9. The optical directional coupler of claim 1, wherein the first leg has a first refractive index, the second leg has a second refractive index, and the first refractive index does not equal the second refractive index.

10. An optical switch comprising:
    a first directional coupler configured to receive an input optical signal and produce a first portion of the input optical signal and a second portion of the input optical signal, wherein a transmittance of the first directional coupler of the input optical signal to the second portion of the input optical signal is below −15 dB for both transverse electrical (TE) mode and transverse magnetic (TM) mode over a wavelength range spanning at least 40 nm in a 1310 nm waveband;
    a first leg configured to receive the first portion of the input optical signal and produce a first phase shifted optical signal;
    a second leg configured to receive the second portion of the input optical signal and produce a second phase shifted optical signal; and
    a second directional coupler configured to receive the first phase shifted optical signal and the second phase shifted optical signal.

11. The optical switch of claim 10, wherein the first directional coupler comprises:
    a first coupler, wherein the first coupler has a first coupling length, wherein the first coupler is configured to receive the input optical signal and couple a first coupled optical signal to a first leg and a second coupled optical signal to a second leg, wherein the first leg is configured to phase shift the first coupled optical signal to produce a first phase shift signal, wherein the second leg is configured to phase shift the second coupled optical signal to produce a second phase shift signal, and wherein the first phase shift signal has a first phase difference relative to the second phase shift signal; and
    a second coupler configured to receive the first phase shift signal and the second phase shift signal and to output the first phase shift signal and the second phase shift signal, wherein the second coupler has a second coupling length.

12. The optical switch of claim 11, wherein the second coupler comprises:
    a third coupler, wherein the third coupler has a third coupling length, wherein the third coupler is configured to receive the first phase shift signal and the second phase shift signal and output a third coupled optical signal to a third leg and a fourth coupled optical signal to a fourth leg, wherein the third leg is configured to phase shift the third coupled optical signal to produce a third phase shift signal, wherein the fourth leg is configured to phase shift the fourth coupled optical signal to produce a fourth phase shift signal, and wherein the third phase shift signal has a second phase difference relative to the fourth phase shift signal; and
    a fourth coupler configured to receive the third phase shift signal and the fourth phase shift signal, wherein the fourth coupler has a fourth coupling length.

13. The optical switch of claim 12, wherein the first coupling length equals the fourth coupling length, the second coupling length equals the third coupling length, and the first phase difference equals the second phase difference.

14. The optical switch of claim 10, wherein the first leg is an active leg and wherein the second leg is a passive leg.

15. The optical switch of claim 10, wherein the first leg comprises:
    a first waveguide phase shifter;
    a second waveguide phase shifter;
    a first polarization rotator optically coupled between the first waveguide phase shifter and the second waveguide phase shifter; and
    a second polarization rotator optically coupled to the second waveguide phase shifter.

16. The optical switch of claim 15, wherein the second leg comprises:
    a third waveguide phase shifter;
    a fourth waveguide phase shifter;
    a third polarization rotator optically coupled between the third waveguide phase shifter and the fourth waveguide phase shifter; and
    a fourth polarization rotator optically coupled to the fourth waveguide phase shifter.

17. The optical switch of claim 15, wherein the first polarization rotator comprises a silicon waveguide having a rib with an etched corner.

18. The optical switch of claim 17, wherein the etched corner of the rib has a height of about 170 nm and a width of about 190 nm.

19. A method of manufacturing a directional coupler, the method comprising:
    calculating a transverse electrical (TE) coupling ratio error function of the directional coupler as a first function of a first coupling length, a second coupling length, and a phase shift;
    calculating a transverse magnetic (TM) coupling ratio error function of the directional coupler as a second function of the first coupling length, the second coupling length, and the phase shift;
    minimizing the TE coupling ratio error function and the TM coupling ratio error function over a wavelength range to produce a selected first coupling length, a selected second coupling length, and a selected phase shift; and
    fabricating the directional coupler having the selected first coupling length, the selected second coupling length, and the selected phase shift.

20. The method of claim 19, wherein minimizing the TE coupling ratio error function and the TM coupling ratio error function comprises setting a first TE coupling length to be approximately equal to a first TM coupling length and a second TE coupling length to be approximately equal to a second TM coupling length.

\* \* \* \* \*